United States Patent [19]

Rabus et al.

[11] 4,172,505
[45] Oct. 30, 1979

[54] METHOD AND APPARATUS FOR ELIMINATING TRANSMISSION JOLT IN MOTOR VEHICLES

[75] Inventors: Friedrich Rabus, Schwieberdingen; Josef Wahl, Stuttgart; Ferdinand Grob, Besigheim, all of Fed. Rep. of Germany

[73] Assignee: Robert Bosch GmbH, Stuttgart, Fed. Rep. of Germany

[21] Appl. No.: 867,332

[22] Filed: Jan. 6, 1978

[30] Foreign Application Priority Data

Jan. 11, 1977 [DE] Fed. Rep. of Germany ....... 2700788

[51] Int. Cl.² ............................................. B60K 23/02
[52] U.S. Cl. .................................. 180/290; 74/752 D; 74/862; 180/178; 192/0.076; 192/52; 192/84 R; 192/103 C
[58] Field of Search ............... 180/100, 103 R, 105 R, 180/105 E; 192/103 C, 52, 84 R, 0.076; 74/862, 752 D

[56] References Cited

U.S. PATENT DOCUMENTS

| 3,752,284 | 8/1973 | Brittain | 192/103 C |
| 3,942,393 | 3/1976 | Forster | 192/103 C |

Primary Examiner—John P. Silverstrim
Attorney, Agent, or Firm—Frishauf, Holtz, Goodman & Woodward

[57] ABSTRACT

As a clutch between a motor and a vehicle transmission is progressively engaged through the region of slipping engagement, the jolt effect produced is measured and at the same time the jolt effect that would be produced if the clutch were at once grippingly (fully) engaged is predicted. The higher of the respective measured and predicted jolt effects is subtracted from a signal representing maximum permissible jolt, and the resulting difference is used as the input of a three-term (PID) controller, the output of which produces a displacement of an electrically actuatable clutch control member. The controller and control member are so designed that when the controller is shut off, the clutch goes at once into full engagement. The circuit compares motor speed with transmission input speed in order to shut off the controller when these two speeds are equal, thus fully engaging the clutch, and also to shut off at the same time the jolt-measuring and predicting circuits. These same inputs are also compared to bring the predicting circuits into operation only if these inputs and their first derivatives differ in the same sense, meaning that their speeds are approaching to each other.

43 Claims, 13 Drawing Figures

METHOD AND APPARATUS FOR ELIMINATING TRANSMISSION JOLT IN MOTOR VEHICLES

This invention relates to the control of clutching between a motor and an automatic or semiautomatic transmission of a motor vehicle on a primarily electronic basis in such a way as to minimize jolt effect in gear shifting and in starting. It deals, of course, with vehicles equipped with stepwise operating transmissions.

BACKGROUND AND PRIOR ART

German published patent application (OS) No. 2 124 024 shows a system for regulation or control of shift members of an automatic stepwise transmission of a motor vehicle in which a friction clutch between motor and the portion of the transmission that turns with the vehicle wheels has its engagement controlled with reference to a predetermined change of motor speed with respect to time. This predetermined amount of motor speed change is determined as a quantity that depends on the motor speed value, the motor torque, the direction of shift, the selection gear, the transmission oil temperature and the loading condition. The value of permissible jolt thus calculated and the actual value of jolt effect calculated by the time derivative of motor speed are supplied to a control circuit the output amplifier of which drives a mechanical control of a pressure controller for actuation of a friction clutch. The peak values of torque and of the oil pressure in the pressure control that occur during the shifting operation are diminished by the provision of delay devices, for example RC circuits in the electronic equipment or oil valves in the hydraulic equipment. A disadvantage of this known system is that the actual amount of jolt effect is only imperfectly determined, and the jolt that takes place after the engagement of the friction plates of the clutch, that is caused by the stiffness of the mechanical drive connection to the wheel, is not taken account of.

It is an object of the present invention to provide a more effective calculation of the potential jolt effect, so that the proper time for the engagement of a friction clutch in automatic or semiautomatic gear shifting can be more effectively determined without producing jolts not taken account of in the determination and without requiring the complication of delay and damping devices for smoothing jolt effects.

THE PRESENT INVENTION

It is an object of the present invention to provide a method and apparatus for automatically operating a clutch between the engine and a stepwise operating transmission of a motor vehicle in such a way as to take account of the jolt effect actually present by reference to physically relevant parameters in order to provide a smooth transition into full engagement of the driving shaft connected to the motor with a driven shaft connected through the transmission to the vehicle wheels.

Briefly, not only is the value of actual jolt effect continuously computed, but the maximum total jolt effect in the event the clutch were fully engaged without delay is also calculated (predicted) and the higher of the two values is compared with the maximum permissible value of the clutching jolt and the difference signal so provided is utilized as a positioning signal for the control member of the clutch.

The term "jolt" or "jolt effect" means a substantial increase of accelerating or deceleration of the vehicle, hence, an increase or decrease in force felt by the occupants, and as such it is necessarily of relatively of short duration.

A variety of ways of measuring actual jolt effect are possible and likewise a variety of useful ways of computing a prediction jolt effect and it is practical to provide several of each in the clutch-control system, selectable according to local driving conditions or requirements or to the mechanical configuration of the vehicle, by service personnel, and the vehicle driver and/or maintenance personnel should preferably be able to select the maximum permissible jolt value for type of driving (sport, comfort, etc.).

DRAWINGS, ILLUSTRATING AN EMBODIMENT

The invention is further described by way of illustration with reference to the annexed drawings, in which.

Figure 2:
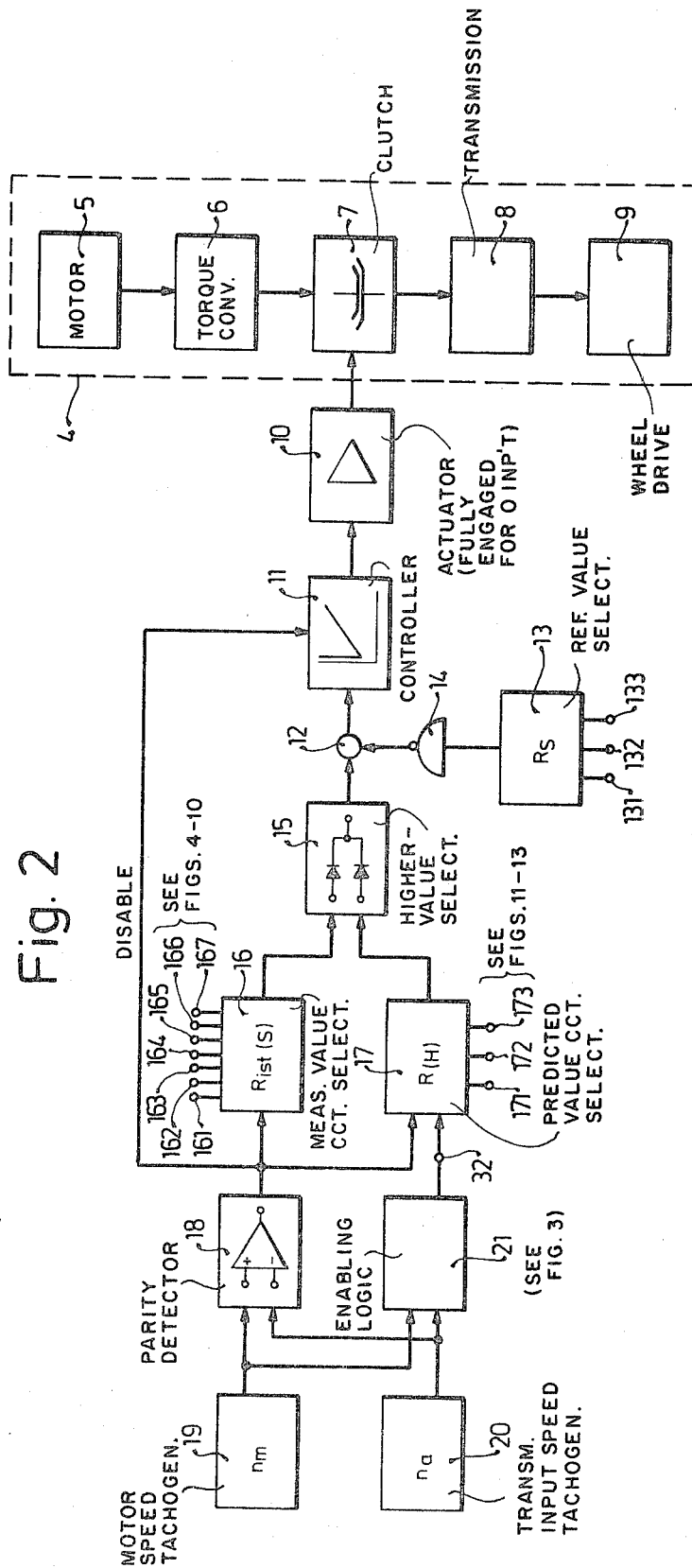
FIG. 2 is the basic circuit diagram of an embodiment of apparatus for carrying out the invention.
Figure 3:
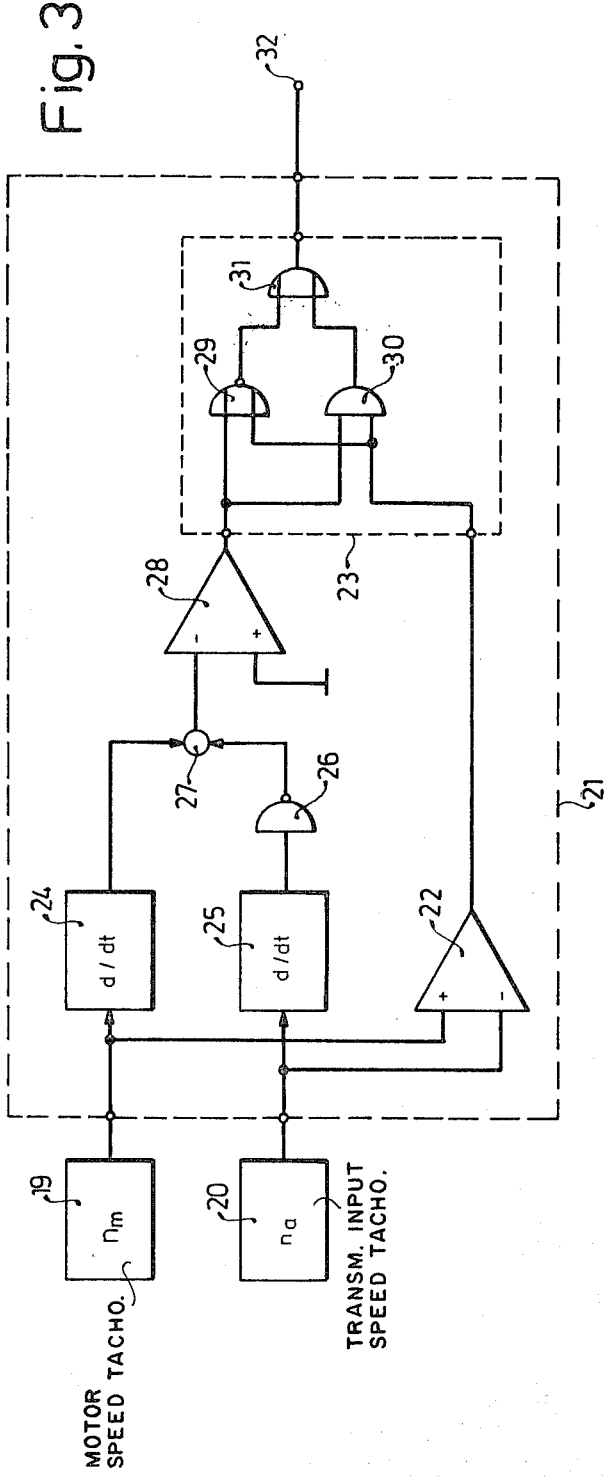
FIG. 3 is the basic circuit diagram of a portion of the circuit shown in FIG. 2.

the circuits of FIGS. 4–13 all being circuits for use in connection with the circuits shown in FIGS. 2 and 3.

Vehicles equipped with automatic or semiautomatic stepwise-variable transmissions as a rule have clutches equipped with control or positioning members for actuating the friction plates of the clutch. It is usually sought to limit the jolt effect upon shifting gears to a permissible amount by suitable hydraulic drive of the relative position of the friction plates. The present invention makes it clear that by means of preferably electronic means, clutch plates or, quite generally, slip friction gripping force-transmitting members, can be so controlled that, on the one hand, coupling can be quickly accomplished to reduce wear of the clutch elements and, on the other hand, the coupling can be accomplished in such a way that no disturbing jolt effect takes place. A basic consideration underlying the invention is a concept of a maximum permissible value of the jolt effect $R_s$. This jolt effect value can, if desired, be made dependent upon driving conditions, for example, a driver engaged in a sporting type of driving could be prepared to experience relatively strong jolts, as the price of quick pickup or the like. Thus, one can express the maximum permissible jolt effect as a function of the loading condition of the vehicle (throttle position $\alpha$, or the intake manifold vacuum $\phi$, or the quantity of air $Q_L$ sucked in by the intake per unit of time) and/or the particular gear in use (ratio r) which maximum value can be stated as:

$$R_s = R_s(r, p; \alpha; Q_L).$$

In the slip region, i.e. while the friction plates are in slipping engagement, the transferred torque can be prescribed a priori. Such control in the slip region can, for example, can limit the jolt effects in starting up. The clutch transfers a torque, the driving and driven speeds approach each other and the vehicle is accelerated or decelerated. When the driving and driven speeds of rotation are equal, friction coupling finally leads to gripping coupling. Furthermore, after the gripping of the friction elements, there is an energy exchange between driving and driven sides that has an oscillatory type of time course and thus produces a jolting of the vehicle. The maximum gear shift jolt upon the completion of clutching, i.e. the peak value of the oscillatory phenomenon, can be predicted by calculation.

FIG. 1a shows the time-course of the motor speed and the transmission input speed during a typical upshift operation. The region of slip engagement of the friction plates is designated by the letter S, and the region of gripping engagement of the friction plates by the letter H. As can be seen from the graph, the motor speed at first increases, then diminishes, however, with increasing gripping of the friction plates. The transmission input speed has a rising course, so that the two curves approach each other at an angle $\Delta\phi$. The value of the angle $\Delta\phi$ is a measure for "soft" or "hard" clutching.

In the gripping region of the friction plates, the transmission input speed at first increases further, but then has a swinging course until it reaches its end value. The vehicle speed can be derived from the transmission speed and from the vehicle speed the first time derivative of vehicle speed $\dot{v}_F$ can be obtained. The course of this first time derivative of vehicle speed $\dot{v}_F$ is illustrated in FIG. 1b. From the first derivative of vehicle speed $\dot{v}_{HF}$, which is the vehicle acceleration, there can be obtained by a further differentiation with respect to time the second time derivative of vehicle speed $\ddot{v}_F$, the time course of which is illustrated in FIG. 1c. This second time derivative of vehicle speed $\ddot{v}_F$ corresponds to the jolt effect on the vehicle. As can be observed by comparison of FIGS. 1a to 1c, in the case of corresponding prescription of the amount of jolt effect in the slip-engagement region of the friction plates, the jolt effect has an approximately constant positive value. After the occurrence of gripping of the friction elements at the instant $t_1$, the value of jolt first declines, then reaches a negative maximum value and finally swings back to the value zero. As can be gathered from FIG. 1c, this is already a case of a controlled time-course of jolt effect, since the boundaries of the prescribed maximum permissible jolt effect $R_s$ were not exceeded. In the region of slipping friction elements, the jolt effect was controlled to a constant value just below the maximum permissible value and even after the occurrence of gripping of the friction elements, the value of the jolt effect did not exceed the permissible limits.

FIG. 2 is a basic circuit diagram of one form of apparatus for carrying out the above described operations according to the invention. A vehicle propulsion system 4 consists in the usual way of a motor 5, a torque converter 6, a friction clutch 7, a transmission 8 and the drive wheel assembly 9 including the usual differential drive. The clutch 7 enables the torque converter 6 driven by the motor 5 to be coupled with the wheels 9 through the transmission 8 or to be uncoupled therefrom. A control member 10 is operated electrically to position the clutch plate for disengagement, slipping engagement or gripping engagement by progressivement from one position to another in response to a controller 11 that responds in turn to a positioning signal and is preferably a three-term or PID controller (i.e. proportional plus floating plus derivative control characteristic).

The input of the controller 11 is connected with a summing circuit 12 that produces a signal corresponding to the sum of the signals received at its two inputs. At a first input the summing circuit 12 receives, through an inverter 14, a signal representative of a reference value of jolt effect provided by the reference jolt generating circuit 13. The output of the circuit 13 can be simply a fixed predetermined voltage or it may be a voltage dependent upon operating conditions of the vehicle, or dependent on a setting by the driver, but the particular choice of the reference value of jolt effect, which is treated in the circuit as the maximum permissible amount of jolt, forms no part of this invention and is therefore not further shown, but the terminals 131, 132 and 133 represent the possibility of connections to make the output signal of the circuit 13 vary with operating conditions. The presence of the inverter stage 14 can be regarded, further, as converting the summing circuit 12 into a subtracting or comparing circuit, of course.

The second input of the summing circuit 12 is connected to a higher-value selector stage 15 that passes to the summing circuit 12 that one of its two input signals that has the higher value. One of these two input signals comes from the measuring circuit selector 16 and the other comes from the calculating circuit selector 17 that together with a logic circuit 21 for enabling the calculation output constitutes the calculating means of the apparatus for providing a predicted jolt value.

The basic inputs to the apparatus shown in FIG. 2 are provided by a motor speed transducer 19 and a transmission input speed transducer 20 that may both conveniently be inductive tachogenerators providing pulses of a frequency corresponding to the speed of rotation of the motor crank shaft or of the output shaft of the torque converter 6, in one case, and of the input shaft of the transmission 8 in the other case, followed in each case by a circuit for producing a voltage representative of the output frequency of the inductive tachogenerator (such frequency measuring circuits with an analogue voltage output are well known and need not be further described.) The outputs of both the transducers 19 and 20 are supplied both to the first comparator 18 and to the enabling logic circuit 21. The latter (which is further described in FIG. 3) applies its output over a terminal 32 to the calculating circuit selector 17. The first comparator 18 has an output that supplies a switching signal for turning on and off the controller 11, the measuring circuit 16 and the calculating circuit selector 17 and has connections for that purpose to enabling-disabling inputs of these respective circuits. The measuring circuit selector 16 has input terminals 161–167 to which other circuits described below with reference to other figures of the drawings are connected, at least one being necessary. The calculating circuit selector 17 likewise has input terminals 171, 172 and 173 to which other circuits described in other figures are or may be connected as further set forth below, at least one being needed. The respective outputs of the measuring circuit selector 16 and of the calculating circuit selector 17 are, as already described, connected to the inputs of the higher-value selector circuit 15.

The measuring circuit selector 16, in combination with such other circuits as may be connected to various of its input terminals 161–167, serves to provide a measure of the actual jolt effect $R_{ist(S)}$ to which the vehicle is subject while the friction clutch 7 is in its slipping engagement range of (S) range of operation. For this purpose, as can be determined from FIGS. 4–10 where the respective input terminals 161–167 of the measuring circuit 16 also appear, the measuring circuit selector 16 is able to receive information of the actually present jolt effect during clutching in the slipping engagement range (S) of the clutch 7.

Figure 11:
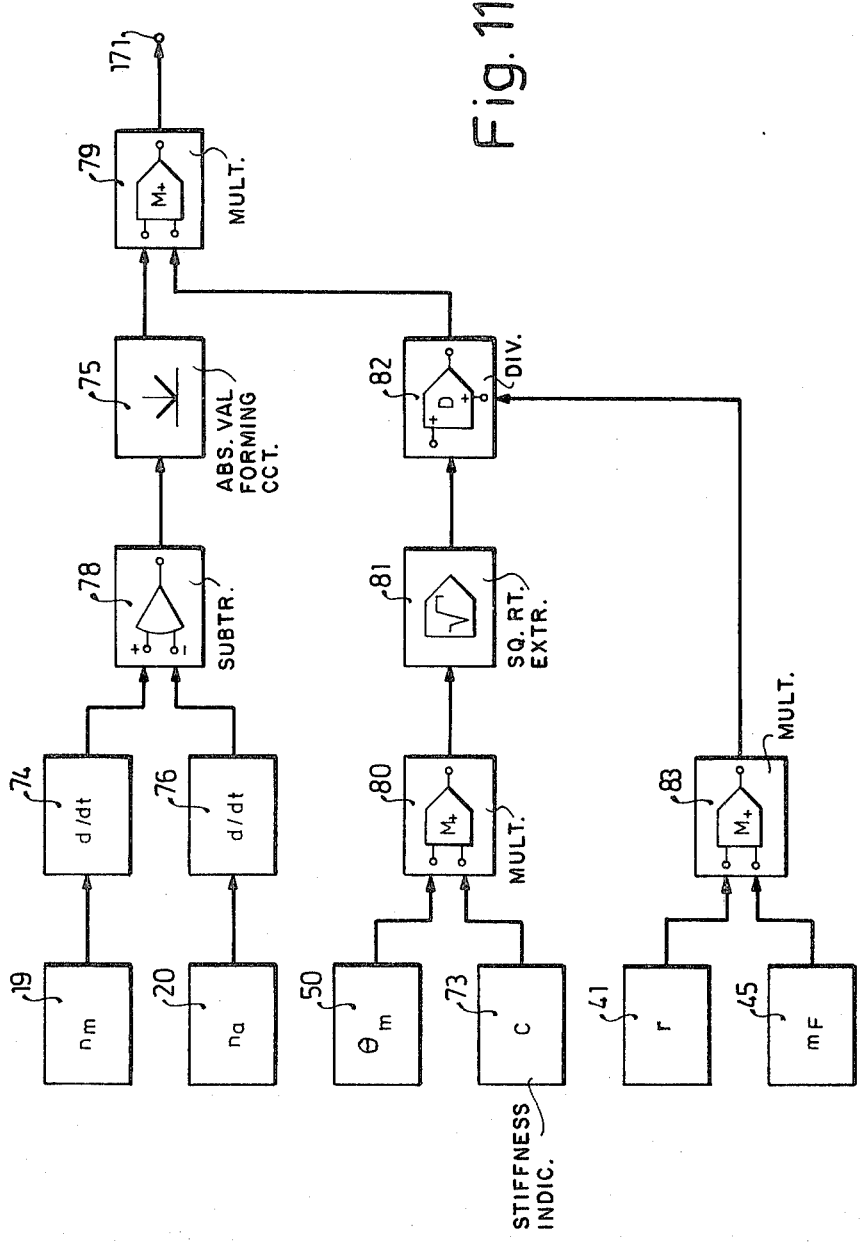
FIG. 11 is the basic circuit diagram of a first apparatus for predicting a jolt effect.
Figure 12:
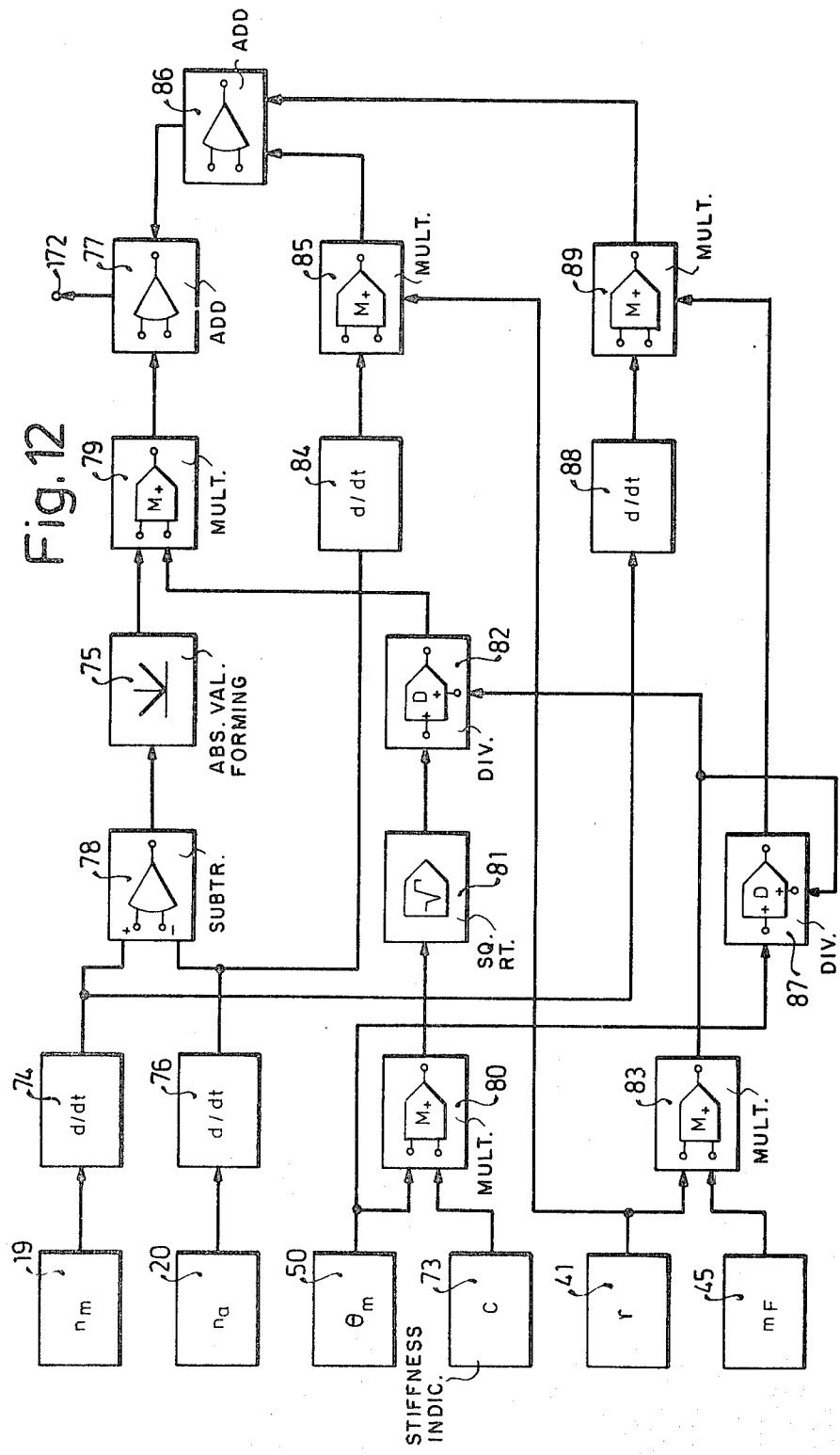
FIG. 12 is the basic circuit diagram of a second apparatus for predicting a jolt effect.
Figure 13:
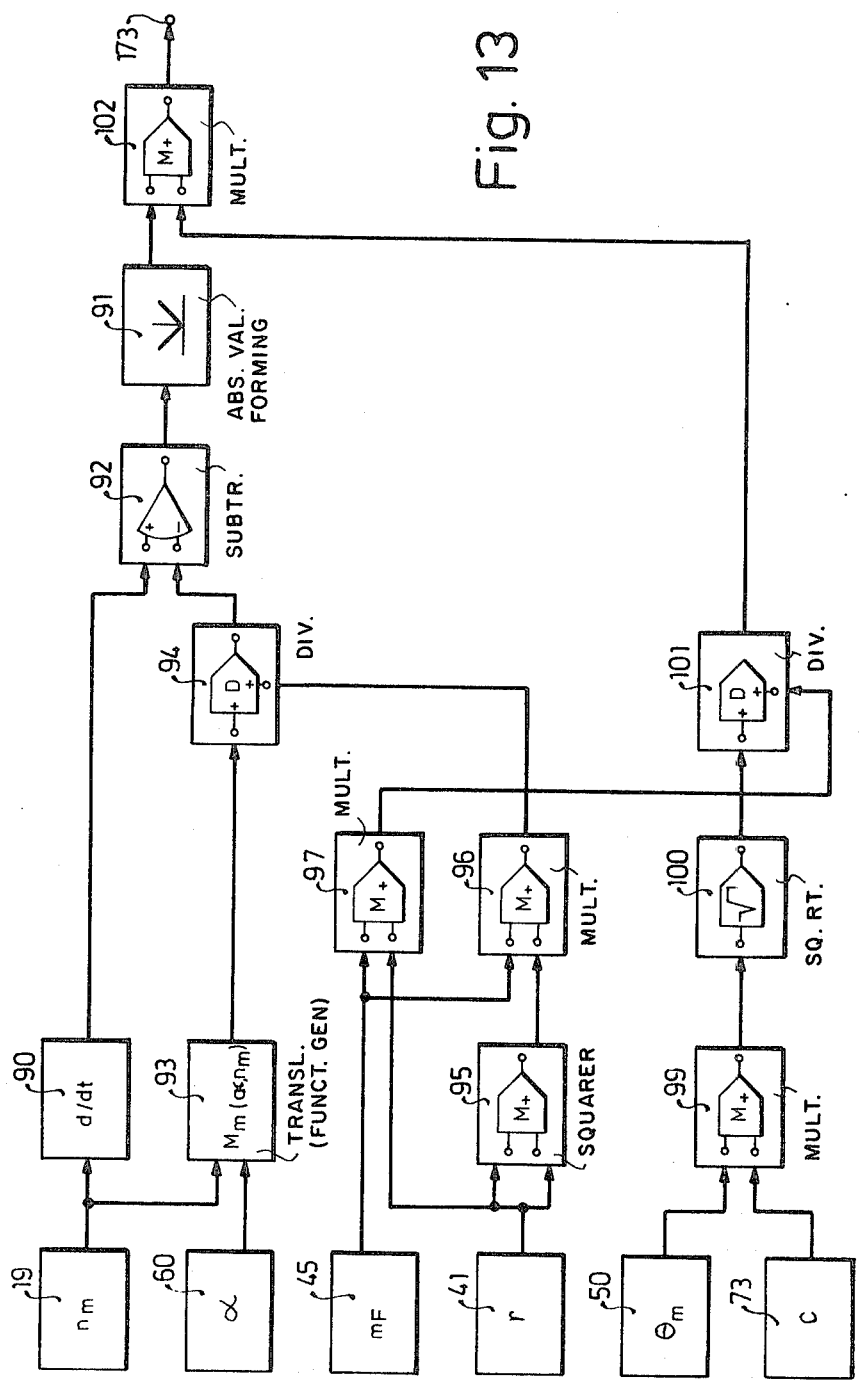
FIG. 13 is the basic circuit diagram of a third apparatus for predicting a jolt effect.

The calculating circuit selector 17 is the output unit or stage for the operation of calculating the peak value of jolt effect $R_{(H)}$ to which the vehicle would further be subject, if at the instant of time in question a full power transfer condition of the friction clutch were brought about (gripping or rigid engagement of the clutch plates). For this purpose the calculating circuit selector 17 is provided with input terminals 171 to 173 over which information can be supplied to the circuit in the manner that is illustrated in FIGS. 11–13 respectively. The output signal value of the calculating circuit selector 17 is therefore a purely hypothetical value calculated in advance (i.e. in a sense, a predicted value) for a corresponding condition that only becomes a reality when, as the result of the overall control operation, the clutch plates are finally put completely together, in which case, of course, the jolt effect always lies below the maximum permissible value $R_s$. The higher of the two signal values provided respectively by the measuring circuit selector 16 and by the calculating circuit selector 17 is supplied by the higher-value selector stage 15 to the summing circuit 12. A maximum permissible value for the jolt effect $R_s$ is provided by the jolt effect reference value selector 13 from information supplied in electrical form to the terminals 131–133. The value $R_s$ can, as already mentioned, be either arbitrarily fixed (e.g. for sport driving at one value and for comfortable driving at another value) or automatically variable (engine load condition, transmission gear ratio, oil temperature, etc.). The difference between the prescribed maximum permissible jolt effect and the value delivered by the higher-value selector circuit 15 is supplied by the summing circuit 12 to the controller 11.

Figure 1:
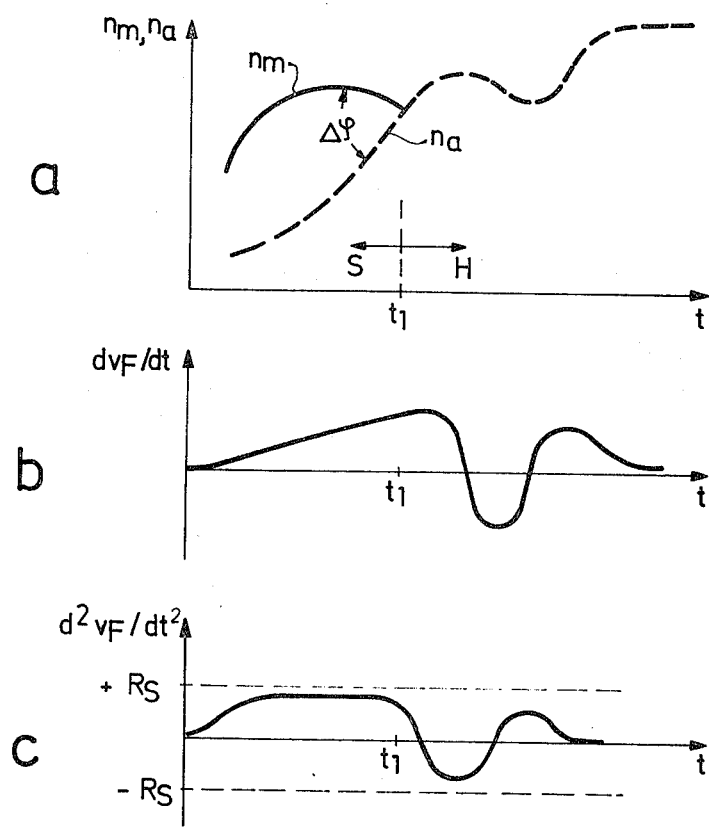
FIG. 1 is a graph showing the time-course of motor speed and transmission input speed and the first and second derivatives with respect to time of the vehicle velocity during a gear-shifting operation.

As already mentioned, behavior of the clutching control system is controlled ultimately by the motor speed and the transmission input speed which are measured by the corresponding transducers 19 and 20. The signals resulting from these measurements are supplied, as already mentioned to the enabling logic circuit 21 which is constituted as shown in FIG. 3 so that it can be determined whether the time-courses of motor speed and transmission input speed are moving towards each other as shown in FIG. 1. If this is the case, a signal is produced at the output terminal 32 that sets the selected calculation circuit into operation. In other words, the calculating circuit selector 17 has two enabling inputs both of which must have enabling signals for the circuit to be put into operation, one of them controlled by the comparator 18 and the other by the enabling logic circuit 21. The calculating circuit selector 17 and its associated circuits provide the actual calculation of the signal to be furnished by the selector 17 to the higher-value selector circuit 15. The values of motor speed and transmission input speed are also supplied to the comparator 18 which is so constituted and connected as to disable the measuring circuit selector 16, the calculating circuit selector 17 and the controller 11 when the motor speed is equal to the transmission input speed, while under all other conditions the measuring circuit selector 16 and the controller 11 are enabled and the circuit selector 17 is conditionally enabled. When the controller 11 is shut off by the comparator 18, the effect is to produce a complete gripping of the friction plates of the clutch 7. The electrically operated control member 10 is to be understood as so constituted that when the controller 11 is shut off, complete engagement of the clutch 7 follows immediately.

Upon the initiation of a clutching operation, it being assumed that previously the clutch 7 has been disengaged for gear shifting, the clutch 7 is then so controlled in its slipping engagement range by the effect of measuring circuit selector 16, that the resulting jolt effect cannot exceed the prescribed maximum jolt value $R_s$. In other words, at the beginning no jolt effect is measured through the circuit selector 16 and the difference signal provided by the summing circuit 12 to the controller 11 is accordingly equal to the maximum permissible jolt effect $R_s$, but as soon as jolt effect resulting from the consequent slipping engagement of the clutch 7 is measured by the circuit connected through the selector 16, the measured value is subtracted from the maximum permissible jolt effect $R_s$ and a smaller signal is furnished to the controller 11, resulting in less displacement of the control member 10 towards the clutch engagement. As soon as the enabling logic circuit 21 determines, from the value of motor and transmission input speeds, that these two values are moving towards each other, the calculating circuit selector 17 is put into operation, causing a circuit connected through it to predict at every moment the jolt effect that would be produced upon closing together of the friction plates at the particular moment. By control of the clutch 7 by whichever of the respective outputs of the measuring circuit selector 16 and the calculating circuit selector 17 is at the higher value, the result is obtained that also after the closing together of the friction plates of the clutch 7, i.e. when the control operation is completed, no jolt effect will take place that exceeds the value $R_s$. As soon as the motor speed is equal to the transmission input speed, as mentioned before, the clutch plates close completely together and the operation of the controller, the measuring circuit selector 16 and the calculating circuit selector 17 are shut off.

As mentioned before, FIG. 3 shows the basic circuit diagram of one form in which the enabling logic circuit 21 can be constituted. Here the output of the motor speed transducer 19 is connected through a first differentiating stage 24 with a summing circuit 27. Similarly the output of the transmission input speed transducer 20 is connected to a second differentiating stage 25, the output of which is supplied to an inverter stage 26 that furnishes its output to the other input of the summing circuit 27, so that the summing circuit 27, like the summing circuit 12, by virtue of an inverter at one input, operates as a subtracting or comparator circuit. The output of the summing circuit 27 is supplied to the inverting input of a third comparator 28 that has its non-inverting input connected to chassis ground, which is to say to the usual neutral reference voltage. The input of the third comparator 28 is connected with the input of a parity detection circuit 23, which may be referred to as an equivalence stage. The motor speed transducer 19 and the transmission input speed transducer 20 are further connected to the inputs of a second comparator 22 that has its output connected to the second input of the equivalence stage 23. The output of the equivalence stage 23 is connected to the output terminal 32.

The two inputs of the equivalence stage 23 are respectively connected to the inputs of a NOR gate 29 and likewise to the two inputs of an AND gate 30. The outputs of these gates are respectively connected to the two inputs of an OR gate 31. The purpose of the enabling logic circuit 21 is to determine from the time course of the motor speed and of the transmission input speed whether these two speed values are moving towards each other, as was for example the case in the situation shown in FIG. 1a. This determination is made by comparing the first time derivatives of motor speed and transmission input speed with each other and likewise comparing the absolute values of these speeds. The two curves of motor speed and transmission input speed run towards each other if the difference of the time derivatives of motor and transmission input speed is greater than zero and the motor speed is smaller than the transmission input speed or if the difference between the time derivatives of motor speed and transmission input speed is smaller than zero while the transmission input speed is smaller than the motor speed. A positive signal is present at the output terminal 32 of the first calculating circuit 21 only if at least one positive signal is present at the input of the OR gate 31. This is however the case only if both the comparators 22 and 28 have output signals of the same sign, which is to say either both positive or both negative. If for example the time derivative of motor speed is smaller than the time derivative of transmission input speed, a negative signal is present at the summing circuit 27 and the output of the third comparator 28 is positive. If at the same time the absolute value of motor speed is greater than that of the transmission input speed, the output of the second comparator 22 is likewise positive. The combination of these two conditions is a criterion for the mutual approach of the curves of FIG. 1a and correspondingly a positive signal is produced at the output terminal 32.

FIGS. 4 to 8 are basic circuit diagrams of apparatus for measuring jolt effect. The amount of jolt to which the vehicle is actually subject is measured by processing various physical parameters the values of which can readily be picked up electrically by measuring devices on board the vehicle.

Figure 4:
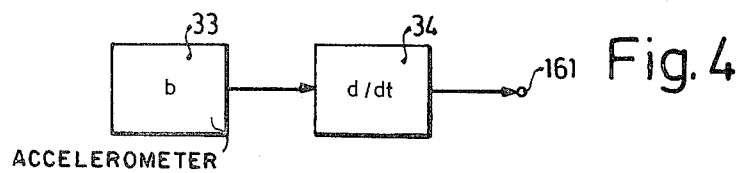
FIG. 4 is the basic circuit diagram of a first apparatus for measuring the jolt effect.

In FIG. 4 there is shown an accelerometer the output of which is connected through a third differentiating stage 34 with the terminal 161 the measuring circuit selector 16 that operates as the final stage of the measuring operation. Since the jolt or jolt effect is defined as the time rate of change of vehicle acceleration or deceleration its amount can be obtained by differentiating vehicle acceleration-deceleration and supplied to the measuring circuit 16 input terminal.

The voltage at the terminal 161 of the measuring circuit selector 16 accordingly corresponds to the relation:

$$U_{161} \sim \dot{b}$$

Figure 5:
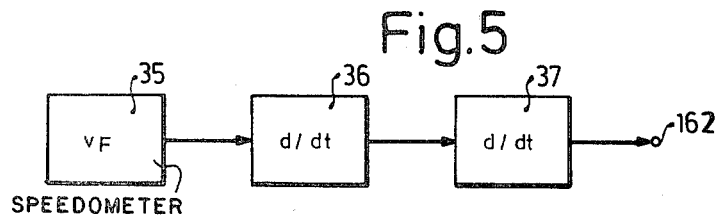
FIG. 5 is the basic circuit diagram of a second apparatus for measuring the jolt effect.

In FIG. 5 there is shown a speedometer 35 producing electrical output representative of vehicle speed and supplying it through a fourth differentiating stage 36 and thereafter through a fifth differentiating stage 37 to the terminal 162 of the measuring circuit selector 16. By this solution of the jolt measuring task, the vehicle speed is utilized for measuring the jolt effect, it being necessary for this purpose to differentiate the speed signal twice in succession. The voltage at the terminal 162 of the measuring circuit selector 16 accordingly corresponds to the relation:

$$U_{162} \sim \ddot{v}_F$$

Figure 6:
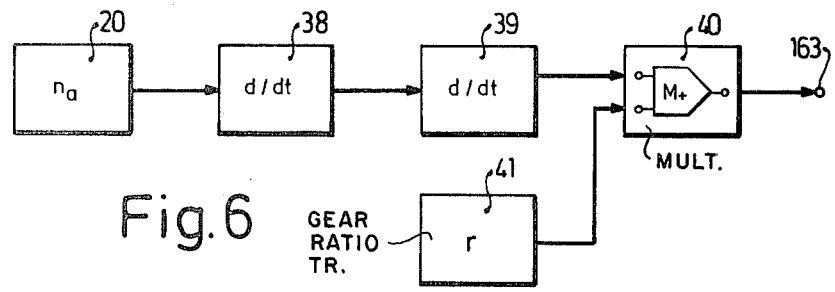
FIG. 6 is the basic circuit diagram of a third apparatus for measuring the jolt effect.

FIG. 6 shows the output of the transmission input speed transducer 20 going through a sixth differentiating stage 38 and then through a seventh differentiating stage 39 to the input of a first multiplier stage 40 that has its second input connected to a gear ratio transducer 41 that provides a signal representative of the gear ratio in use in the transmission. The output of the first multiplier stage 40 is supplied to the terminal 163 of the measuring circuit selector 16. The transmission input speed $n_a$ is related to the speed of travel $v_F$ of the vehicle by the factor of the gear ratio r. The jolt effect on the vehicle can be obtained as in the previous example by twice differentiating the transmission input speed $n_a$ and then multiplying by the gear ratio r, since multiplication by a constant can be done either before or after differentiation. The voltage at the terminal 163 of the measuring circuit selector 16 then corresponds with the relation:

$$U_{163} \sim r\ddot{n}_a$$

Figure 7:
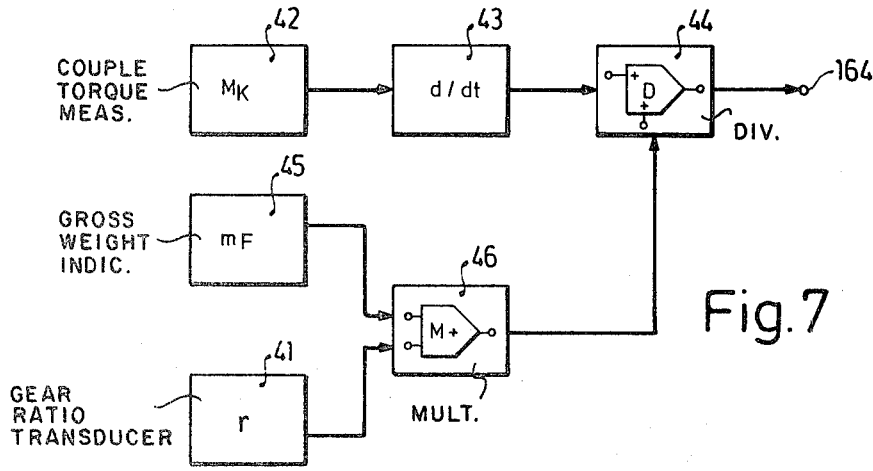
FIG. 7 is the basic circuit diagram of a fourth apparatus for measuring the jolt effect.

FIG. 7 shows a torque transducer 42 having its output connected through an eighth differentiating stage 43 with the dividend input of a first divider stage 44, to the divisor input of which there is connected the output of a second multiplier stage 46. The two inputs of the second multiplier 46 are provided respectively by a vehicle mass transducer 45 and the gear ratio transducer 41. The output of the first divider stage 44 is supplied to the terminal 164 of the measuring circuit selector 16. The jolt effect to which the vehicle is subject during clutching is proportional to the time derivative of the torque $M_K$ and inversely proportional to the vehicle weight or mass $m_F$ and to the gear ratio r. From the foregoing relations applying to the vehicle machinery, there has been developed the basic circuit of FIG. 7 which shows the provision of a voltage of a value corresponding to the first time derivative of the coupling torque $M_K$ divided by the product of vehicle mass and the gear ratio r. The voltage at the terminal 164 of the measuring circuit selector 16 therefore corresponds to the relation:

$$U_{164} \sim \frac{\dot{M}_K}{rm_F}$$

Figure 8:
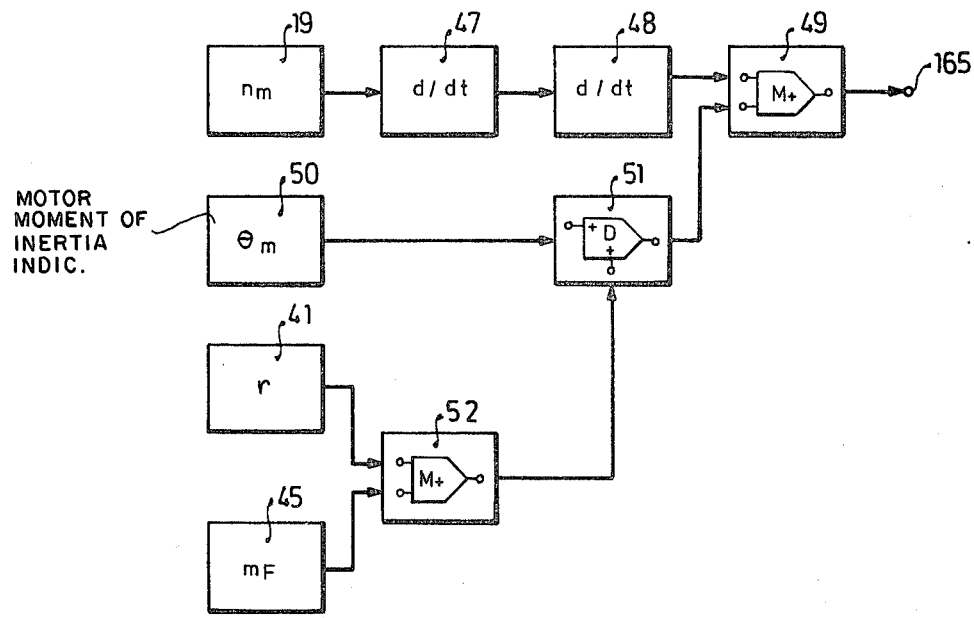
FIG. 8 is the basic circuit diagram of a fifth apparatus for measuring the jolt effect.

In FIG. 8 the motor speed transducer 19 is connected through a ninth differentiating stage 47 and a tenth differentiating stage 48, in succession, with the first input of a third multiplier stage 49 that has its second input connected to the output of a second dividing stage 51. The output of a signal-producing device that supplies a voltage representative of the moment of inertia of the motor is supplied to the dividend input of the second dividing stage 51, while the divisor input of that dividing stage is connected to the output of a fourth multiplying stage 52. If the moment of inertia of the motor $\theta_m$ is known and constant, of course, a fixed proportional voltage can be used instead of the output of a transducer 50 producing the voltage in question. The two inputs of the fourth multiplier stage 52 are connected respectively to the outputs of the devices 41 and 45 that respectively provide voltages representative of the gear ratio in use in the transmission 8 and of the vehicle mass. The vehicle mass here in question of course is the mass of the vehicle and its load, and of course the effect of the load can either be set in manually by the driver in accordance with his estimation of the load or an automatic device responsive to the position of the vehicle springs could be provided.

The output of the third multiplier stage 49 is supplied to the terminal 165 in the measuring circuit selector 16. In the basic diagram shown in FIG. 8, the parameters on the driving side of the machinery (motor speed $n_m$ and motor moment of inertia $\theta_m$) are picked up together in the case that a fixed voltage is not used for the moment of inertia. If it can be assumed that a constant motor torque will be present during the clutching operation, the jolt effect on the vehicle is proportional to the second time derivative of the driving speed, e.g. motor speed or speed of the output shaft of a liquid torque converter. It must however still be taken into account that the jolt is the smaller, the larger the vehicle mass is and the higher the gear in use is. The presence of a large moment of inertia in the motor, inclusive of the torque converter if one is present, leads to increase of the jolt effect. Accordingly, the output voltage provided in the circuit of FIG. 8 corresponds to the second time derivative of the motor speed $n_m$ multiplied by the quotient obtained by dividing the moment of inertia $\beta_m$ by the gear ratio r times the vehicle mass $m_F$. The voltage at the terminal 165 of the measuring circuit selector 16 thus corresponds to the relation:

$$U_{165} \sim \ddot{n}_m \frac{\theta_m}{rm_F}$$

Figure 9:
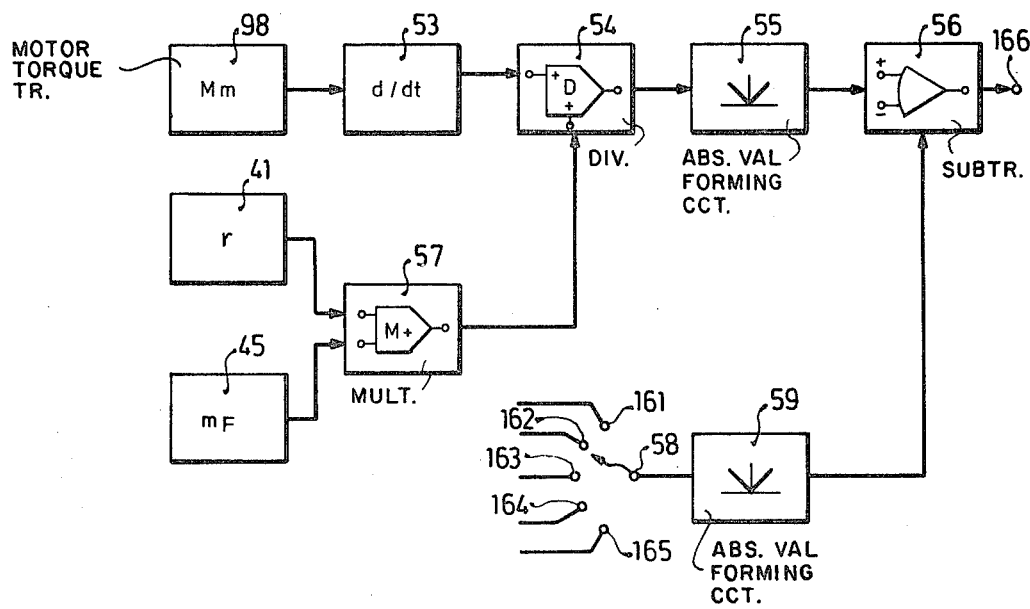
FIG. 9 is the basic circuit diagram for measuring the jolt effect while taking into account the change of the motor torque during the shifting operation.
Figure 10:
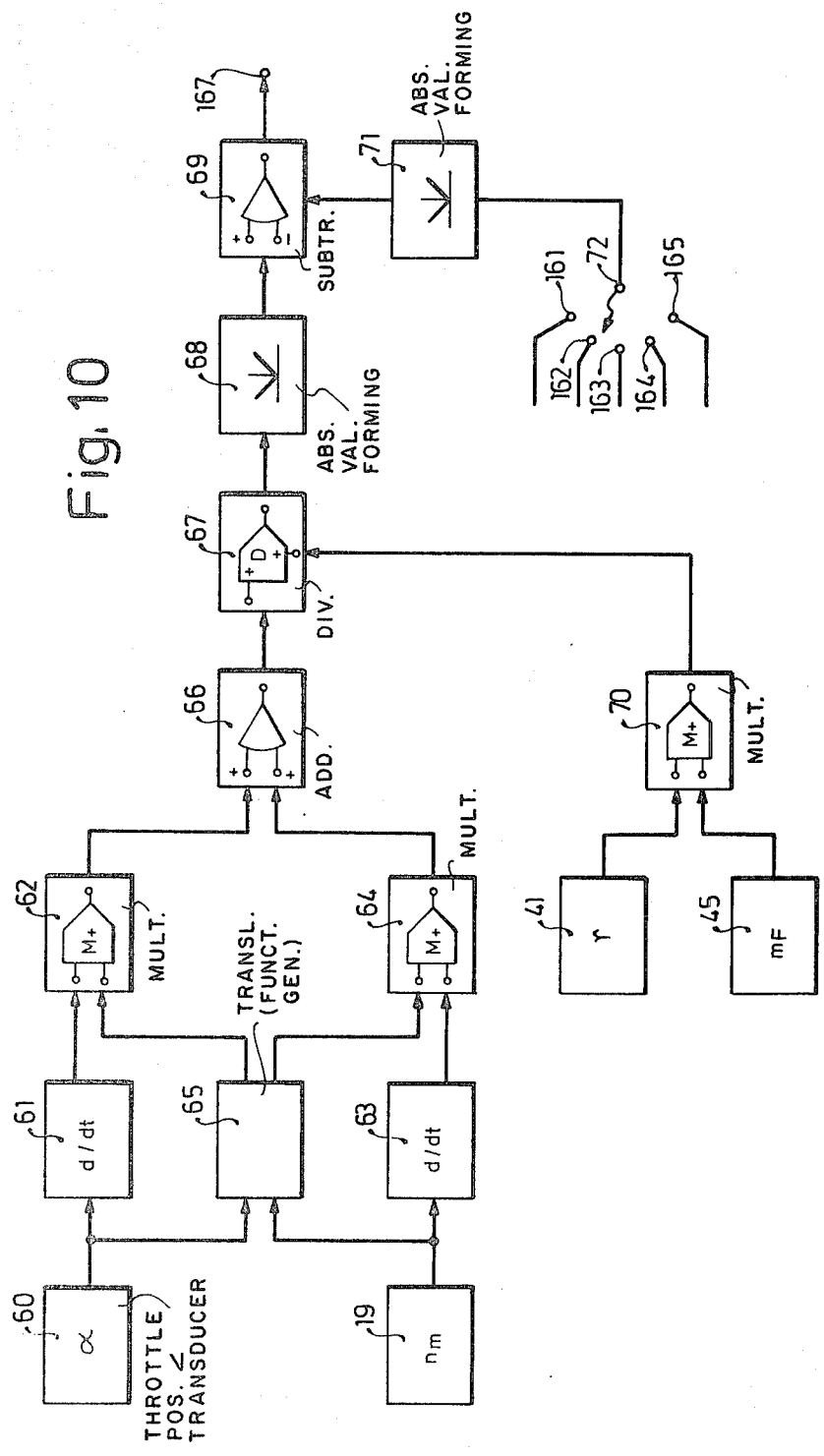
FIG. 10 is the basic circuit diagram of a second device for measuring the jolt effect while taking account of a change of motor torque during the shifting operation.

FIGS. 9 and 10 are basic diagrams of circuits for measuring the jolt effect of taking account of a change in motor torque during the gear-shifting operation. The possibility is not to be excluded that the motor torque could change during clutching, e.g. if the driver steps on the accelerator, as might particularly occur in the case of a semiautomatic transmission. Account can be taken of such an event, either by directly measuring the motor torque or by deriving if from motor speed and load condition. The component of jolt effect produced by a variable motor torque is proportional to the first time derivative of the motor torque. Furthermore, this component of jolt effect is correspondingly lower in the case of large vehicle mass and high gear ratio.

FIG. 9 shows a motor torque transducer 98 connected through an eleventh differentiating stage 53 to the dividend input of a third dividing stage 54 that has its divisor input connected with the output of a fifth multiplier stage 57. The respective outputs of the gear ratio transducer 41 and the device 45 for producing an electrical signal representative of the vehicle mass are supplied to the two inputs of the fifth multiplier stage 57. The output of the third dividing stage 54 is connected through a first absolute-value-forming stage 55 to the noninverting input of a first summing stage 56 that has an inverting input connected, through a second absolute-value-forming stage 59, with a first selective branching point 58, from which connection may be made to any of the terminals 161–165. As already explained, the last-mentioned terminals are respectively connected to circuits represented in FIGS. 4–8.

The output of the first summing stage 56 is connected to the terminal 166 in the measuring circuit selector 16. In the basic circuit of FIG. 9, the component of jolt that is caused by change in the motor torque is taken account of as the first time derivative of the motor torque divided by the product of gear ratio and vehicle mass. In the first summing stage 56, the difference between the absolute value of the signal thus obtained and that of a selected signal connected to the terminal 58 from one of the terminals 161–165 is produced by subtraction. The voltage at the terminal 166 of the measuring circuit selector 16 can be represented by the following relation:

$$U_{166} \sim \left|\frac{\dot{M}_m}{rm_F}\right| - \left|U_{16i\,(i\,=\,1\text{-}5)}\right|$$

If the motor torque $M_m$ cannot be directly measured, it can still be measured in terms of motor speed $n_m$ and by the throttle position angle $\alpha$ or the intake manifold vacuum, by reference to the known relations of the two values in question with the motor torque $M_m$ that can be stored either in a read-only memory in which the measured values provide the address, and the corresponding motor torque can be read out, or by use of a corresponding analog function generator. Such devices can be generically referred to as translators, since they translate a combination of the values of two parameters into the corresponding value of a third parameter.

FIG. 10 shows a throttle position transducer 60 connected through a twelfth differentiating stage 61 with the first input of a sixth multiplier stage 62 into one input of a translator 65 of the kind just mentioned. The motor speed transducer 19 is connected through a thirteenth differentiating stage 63 to a second input of the translator 65 and also to a first input of a seventh multiplier stage 64. The translator stage 64 has an output representative of the rate of change of motor torque with respect to throttle position connected to a second input of the sixth multiplier stage 62 and an output representative of the rate of change of motor torque with respect to motor speed connected to the second input of the seventh multiplier stage 64. The respective outputs of the sixth and seventh multiplier stages are supplied respectively to the two noninverting inputs of a second summing circuit 66, the output of which is supplied to the dividend input of a fourth dividing stage 67. The divisor input of the fourth divider stage 67 is provided by the output of an eighth multiplier stage 70 which has one input connected to the gear ratio transducer 41 and another input connected to the transducer or other device 45 producing an electrical signal representative of the vehicle mass. The output of the dividing stage 67 is supplied to a third absolute-value-forming circuit 68 that has its output connected to the noninverting input of a third summing stage 69 that has an inverting input connected to the output of a fourth absolute-value-forming stage 71, of which the input is connected to a second circuit branching point 72 that may be selectively connected with any one of the five terminals 161–165 to which, as already mentioned, outputs of the respective circuits of FIGS. 4 to 8 are provided. The output of the third summing stage 69, finally, is supplied to the terminal 167 in the measuring circuit selector 16. The voltage that appears at the output of the second summing stage 66 can accordingly be represented in the form of a differential equation as follows:

$$U_{66} \sim \dot{M}_m = \dot{\alpha}\frac{\partial M_m}{\partial \alpha} + \dot{n}_m \frac{\partial M_m}{\partial n_m}$$

which represents the dependence of the motor torque $M_m$ upon the throttle position angle $\alpha$ and the motor speed $n_m$. This signal is then divided by the product of the gear ratio r and the vehicle mass $m_F$, after which the absolute value of the resulting signal, after which there is subtracted therefrom the signal provided at one of the terminals 161–165 (produced by a corresponding circuit of one of the FIGS. 4–8). The voltage at the terminal 167 of the measuring circuit selector 16 therefore corresponds to the relation:

$$U_{167} \sim \left|\frac{\dot{\alpha}\frac{\partial M_m}{\partial \alpha} + \dot{n}_m \frac{\partial M_m}{\partial n_m}}{rm_F}\right| - \left|U_{16i\,(i\,=\,1-5)}\right|$$

In FIGS. 11–13 basic circuit diagrams are given for calculating the value of the jolt effect that would be produced at any particular time in a clutching operation if the complete closing together of the friction plates of the clutch 7 immediately takes place. The physical parameters utilized for this calculation are the motor speed $n_m$, the transmission input speed $n_a$, the moment of inertia $\theta_m$ of the motor, the stiffness C of the transmission and its mechanical connection to the driving wheels of the vehicle, the gear ratio in use r, the vehicle mass $f_F$ and the throttle position angle $\alpha$.

FIG. 11 shows the output of the motor speed transducer 19 being supplied to a tenth differentiating stage 74 that in turn provides its output signal to the noninverting input of a fourth summing stage 78 that has an inverting input that is connected to the output of a fifth differentiating stage 76 that receives an input signal from the output of the transmission input speed transducer 20. The output of the fourth summing stage 78 is processed by a fifth absolute-value-forming stage 75 to the first input of a ninth multiplier stage 79. A second input of the ninth multiplier stage 79 is obtained from the output of a fifth dividing stage 82 that has its dividend input connected to the output of a first square root extracting circuit 81, the input of which is supplied by the output of a tenth multiplying stage 80. The devices 50 and 73 that respectively provide signals corresponding to the moment of inertia of the motor and to the stiffness of the transmission and its connection to the wheels of the vehicle have their respective inputs connected to the two inputs of the tenth multiplier stage 80. The divisor input of the fifth dividing stage 82 is obtained from the output of an eleventh multiplier stage 83 which has its two inputs respectively connected to the outputs of the gear ratio transducer 41 and the vehicle mass transducer 45. The output of the ninth multiplier stage 79 is, finally, supplied to the terminal 171 of the calculator circuit selector 17.

In the fourth summing stage 78 the difference between the respective first time derivatives of the motor speed $n_m$ and the transmission input speed $n_a$ is produced. The absolute value of this difference is then multiplied in the stage 79 with the square root of the product of the motor moment of inertia $\theta_m$ and the stiffness C of the transmission and wheel drive. The resulting quantity must furthermore be divided by the vehicle mass $m_F$ and the gear ratio r, since increase of both these factors leads to a reduction of the jolt effect. The output signal of the basic circuit diagram given in FIG. 11 thus measures the angle between the slopes of the time curve of $n_m$ and $n_a$, which is the angle at which the time courses of these speeds approach each other, as explained in connection with FIG. 1. If this angle, for a particular gear ratio, is less than a particular predetermined value, it can be assured that the jolt effect resulting from the full engagement of the clutch will not exceed a given magnitude. Of course, instead of the transmission input speed $n_a$, the vehicle speed $v_F$ could be used in a manner corresponding to the principles explained in connection with FIGS. 5 and 6. The voltage supplied to the terminal 171 in the calculating circuit selector 17 accordingly is given by the relation:

$$U_{171} \sim \left|\dot{n}_m - \dot{n}_a\right|\frac{\sqrt{\theta_m C}}{rm_F}$$

For a more accurate calculation of the jolt effect occurring aftr the full (gripping) engagement of the clutch, higher time derivatives of motor speed and transmission input speed, or of vehicle speed, need to be brought into account. In FIG. 12, the basic circuit diagram of such an arrangement is shown. The processing of higher time derivatives of the transmission input speed and of the motor speed has the feature that there is added to the output of the circuit of FIG. 11 (such a circuit being clearly recognizable within the diagram of FIG. 12) a component of voltage that corresponds to these higher derivatives. The output of a ninth multiplier stage 79 is, accordingly, supplied to one input of an eighth summing stage 77 that has its second input connected with the output of a fifth summing stage 86. The voltage at the output of the fifteenth differentiating circuit 76 is again differentiated in a seventeenth differentiating stage 84 and then supplied to a first input of a twelfth multiplier stage 85 that has its second input connected with the output of the gear ratio transducer 41. The output of the twelfth multiplier stage 85 is connected with a first input of the fifth summing stage 86. The output of the fourteenth differentiating stage 74 is differentiated again in a seventeenth differentiating stage 88 and then supplied to a first input of a thirteenth multiplier stage 89 that has its second input connected with the output of a sixth dividing stage 87. The dividend input of the sixth dividing stage 87 is connected to the motor moment of inertia transducer 50, while the divisor input of the same dividing stage is connected with the output of the eleventh multiplier stage 83. The output of thirteenth multiplier stage 89 is connected to the second input of the fifth summing stage 86. The second time derivative of motor speed $n_m$ and of transmission input speed $n_a$ are produced by simply operating the differentiating stages 84 and 88 respectively in tandem with the differentiating stages 74 and 76 that are already present in the FIG. 11 circuit. The second derivative of the transmission input speed $n_a$ must still be multiplied by the gear ratio r and, likewise, the second derivative of the motor speed $n_m$ must be multiplied with the quotient obtained by dividing the motor moment of inertia $\theta_m$ by the product of the gear ratio r and the vehicle mass $m_F$. The two terms are finally added together in the fifth summing stage 86 and the resulting sum is added in the eighth summing stage 77 with the output voltage of the ninth multiplier stage 79. The voltage at the terminal 172 in the calculating circuit selector 17 therefore corresponds to the relation:

$$U_{172} \sim \left| \dot{n}_m - \dot{n}_a \right| \frac{\sqrt{\theta_m C}}{r m_F} + \ddot{n}_m \frac{\theta_m}{r m_F} + \ddot{n}_a r$$

Another variation that can be used instead of the circuit of FIG. 12 can be provided by taking account of the power involved in driving the vehicle resulting from friction, as well as taking account of the second time derivatives of motor speed and of transmission input speed. This force of frictional origin that is present before the gripping engagement of the clutch influences the jolt that takes place after gripping engagement. If the characteristic interrelation, for the particular type of motor, of the motor torque $M_M$ as a function of the throttle position angle $\alpha$ and of the motor speed $n_m$ is known, the motor torque $M_m$ can be continuously computed or represented by a signal depending on signals representing the throttle position angle $\alpha$ and the motor speed $n_m$. With recognition and evaluation of the driving torque, the measurement or evaluation of the transmission input speed $n_a$ can be dispensed with. FIG. 13 is the basic circuit diagram of such an arrangement.

In FIG. 13, the motor speed transducer output is supplied through an eighteenth differentiating stage 90 to the noninverting input of a sixth summing stage 92 and is also supplied directly to a translator 93 of the general type described before that has another input provided by the throttle position transducer 60. The output of the translator 93 is connected to the dividend input of a seventh dividing stage 94 that has its output connected with the inverting input of the sixth summing stage 92. The output of the vehicle mass transducer 45 is connected with the first inputs, both of a fifteenth multiplier stage 96 and a sixteenth multiplier stage 97.

The gear ratio transducer 41 is connected to both of the inputs of a fourteenth multiplier stage 95 and also to the second input of the sixteenth multiplier stage 97. The output of the fourteenth multiplier stage 95 is connected to the second input of the fifteenth multiplier stage 96, the latter having its output connected with the divisor input of the seventeenth dividing stage 94.

The respective outputs of the motor moment of inertia transducer 50 and the transmission and following drive stiffness transducer 73 are connected to the inputs of a seventeenth multiplier stage 99, of which the output is connected through a second square root extracting circuit 100 to the dividend input of an eighth dividing stage 101. The divisor input of the latter is connected with the output of the sixteenth multiplier stage 97, while the output of this dividing stage is connected to the second input of a seventeenth multiplier stage 102 that has its first input connected through a sixth absolute value forming stage 91 with the output of the sixth summing stage 92. The output of the seventeenth multiplier stage 102 is supplied to the terminal 173 in the calculating circuit selector 17.

In the sixteenth summing stage 92, the difference is formed between the first time derivative of the motor speed and the quotient obtained by dividing the motor torque $M_m$ by the vehicle mass and the square of the gear ratio r. The absolute value of this difference is multiplied, in a manner corresponding to the circuits shown in FIGS. 11 and 12, by the square root of the product of motor moment of inertia $\theta_m$ and the transmission and following drive stiffness C and also divided by the product of the gear ratio r and the vehicle mass $m_F$. The voltage at the terminal 173 of the calculating circuit selector 17, therefore, corresponds to the relation:

$$U_{173} \sim \left| \dot{n}_m - \frac{M_m}{m_F r^2} \right| \frac{\sqrt{\theta_m C}}{r m_F}$$

To summarize, apparatus circuits have been shown in FIGS. 4 to 8 that measure the jolt effect in the region of slipping engagement of the clutch and FIGS. 9 and 10 show corresponding arrangements for improving the measurement of the jolt effect in the slipping engagement range of the clutch by taking account of changes of motor torque during the gear shifting operation. FIGS. 11 to 13 show apparatus circuits by which the jolt effect after the setting-in of gripping engagement of the clutch can be predicted. Of course, any one of these circuits for measuring the jolt effect during slipping engagement of the clutch can be provided alone and, likewise, any one of the circuits for predicting the jolt effect upon immediate gripping engagement of the clutch, but it is evident that it may be desirable to build an apparatus having a choice of circuits, so that it may be usable in various vehicles that have different operating parameters readily available for being furnished to the apparatus of the present invention through an input transducer. Likewise, it may be desirable to have some options selectable, either by the driver or by a serviceman, so that the particular type of measurement and of calculation most effective in a particular vehicle in a particular kind of service may be selected without having to replace the clutching control equipment entirely.

The various types of circuits used for adding, subtracting, multiplying and dividing are, of course, well known, and similarly square root extracting circuits and differentiating circuits. Absolute value forming circuits are also well known. As the symbol used in connection with the latter circuits in the drawings indicates, the circuit typically has a symmetrical V-type translation characteristic with its downward-pointing apex at the origin, where zero input provides zero output, so that an input (horizontal axis) voltage will produce a positive output whether the input voltage swings negative or positive from zero.

Of course, these various arithmetic and algebraic functions can be provided in electronic circuit stages that operate either on an analog or a digital basis. When the computations are done on a digital basis, there is particularly great flexibility in providing units such as the translators 65 and 93, which can then very easily be provided to work according to any kind of translator characteristic, since it is simply a matter of putting into a read-only memory a table of values for sufficiently small increments of all of the variables. Of course, digital circuits involve the provision of digital-to-analog conversions at various places, synchronizing circuits, and so on, but once they are designed they are remarkably reliable, and in the case of sufficiently large quantity production, they may even be more economical. In the case of a digital apparatus, the absolute value forming circuit may simply be a circuit that sets the sign bit so as to designate a positive number, regardless of whether the input number has a sign bit designating a negative number or a sign bit designating a positive number.

We claim:

1. A method of automatic clutching, by means of a clutch having an engagement control member, for establishing power transmission between the motor and the input shaft of a vehicle transmission of the stepwise variable ratio type, with minimization of peak jolt effect produced, consisting of the steps of:
   measuring the jolt effect actually present from a time when motor and transmission come into slipping engagement until they are grippingly engaged by said clutch;
   in the same period of time computing the magnitude of the jolt effect that would be present if the motor and transmission were immediately grippingly engaged;
   determining which of said jolt effects, measured and computed, is the greater and comparing the one found to be greater with a predetermined maximum permissible jolt effect thereby producing a jolt difference signal, and
   applying said jolt difference signal as a positioning signal to said engagement control member of said clutch.

2. An apparatus for automatically positioning the control member of a clutch interposed between a motor and a stepwise-operating vehicle transmission for bringing about engagement of said clutch with minimization of jolt effect, comprising:
   measuring means for measuring the jolt effect present during slipping engagement of said cluth and providing the measurement result in the form of a first electrical signal;
   calculating means for predicting the peak jolt effect that would be produced by an immediate transition from slipping engagement to gripping engagement of said clutch and providing said predicted jolt effect in the form of a second electrical signal of the same scale as said first electrical signal;
   higher-signal value selecting means for selecting the higher-value of said first and second signals;
   means for providing a third electrical signal representative of maximum permissible jolt effect;
   comparator means responsive to the output of said selecting means and to said third signal for producing a fourth electrical signal representative of the difference between the value of the output of said selecting means and the value of said third signal, and
   means for positioning said control member of said clutch in response to said fourth electrical signal.

3. An apparatus as defined in claim 2 in which said means for positioning said control member of said clutch in response to said fourth electrical signal is a PID three-term controller circuit for applying proportional plus floating plus derivative control having said fourth electrical signal applied at its input and having its output connected so as to move said control member.

4. An apparatus as defined in claim 2 in which there are provided a motor speed transducer (19) for producing an electrical signal representative of motor speed, a transmission input speed transducer (20) for producing an electrical signal representative of transmission input speed and a first comparator (18) having inputs respectively connected to the outputs of said transducers and having an output so connected to enabling control inputs of, respectively, said measuring means, said calculating means and said controller (11) as to switch off said measuring means, said calculating means and said controller (11) when an output is produced by said first comparator (18).

5. An apparatus as defined in claim 4 in which said measuring means includes a circuit for generating a voltage representative of the first time derivative (b) of the vehicle acceleration (b).

6. An apparatus as defined in claim 5 in which said circuit for generating a voltage representative of the first derivative with respect to time (b) of the acceleration (b) of the vehicle comprises an accelerometer (33) for producing an electrical signal corresponding to the acceleration (b) of the vehicle and a differentiation stage (34) having its input connected to the output of said accelerometer (33).

7. An apparatus as defined in claim 5 in which said measuring means includes means for supplying, to said higher-value selecting means (15), a voltage representative of the difference between a first absolute value, which is that of the quotient obtained by dividing the product of the first time derivative of the motor torque ($M_m$) by the product of the gear ratio in use and the vehicle mass ($rm_F$), and a second absolute value, which is that of said voltage representative of the first time derivative (b) of the vehicle acceleration.

8. An apparatus as defined in claim 7 in which said circuit for providing a voltage representative of said difference between said absolute values comprises a motor torque transducer (98) producing an electrical signal representative of motor torque, a differentiating stage (53) having its input connected to the output of said motor torque transducer (98), a divider stage (54) having its dividend input connected to the output of said differentiating stage (53), a multiplier stage (57) having its input connected to the divisor input of said divider stage (54), a gear ratio transducer (41) for producing electrical signals representative of the gear ratio in use and of said vehicle transmission having its output connected with a first input of said multiplier stage (57), a device (45) for producing an electrical signal representative of vehicle mass having its output connected with a second input of said multiplier stage (57), a first absolute value forming stage (55) for producing a signal representative of the absolute value of its input signal having its input connected to the output of said divider stage (54), a summing stage (56) having a non-inverting input connected to the output of said first absolute value stage (55) and having also an inverting input, a second absolute value forming stage (59) having its output connected to said inverting input of said summing stage (56) and having its input connected to, the output of said means for supplying a voltage representative of the first time derivative of the vehicle acceleration the output of said summing stage (56) being connectable to said higher-value selecting means (15).

9. An apparatus as defined in claim 5 in which said measuring means includes means for supplying, to said higher-value selecting means a voltage representative of the difference between a first absolute value, which is that of the quotient obtained by dividing the sum of the first time derivative of the throttle position angle times the rate of change of motor torque with respect to throttle position angle plus the first time derivative of motor speed times the rate of change of motor torque with respect to motor speed by the product of gear ratio in use and the vehicle mass, and a second absolute value, which is that of said voltage representative of the first time derivative of vehicle acceleration.

10. An apparatus as defined in claim 9 in which said circuit for providing a voltage representative of said difference of said absolute values comprises:
   a throttle position angle transducer (60) for producing an electrical signal representative of the angular position (a) of the motor throttle;
   a first differentiating stage (61) having its input connected to the output of said throttle position angle transducer (60);
   a second differentiating stage (63) having its input connected to said motor speed transducer (19);
   a first multiplier stage (62) having a first input connected to the output of said first differentiating stage (61);
   a first summing stage (66) having a first non-inverting input connected to the output of said first multiplier stage (62);
   a second multiplier stage (64) having a second input connected to the output of said second differentiating stage (63) and its output connected to a second non-inverting input of said first summing stage (66);
   a translator stage (65) having one input connected to the output of said throttle position angle transducer (66) and another input connected to said motor speed transducer (19), having a first output that is differential with respect to the first input connected with the second output of said first multiplier stage (62) and a second output that is differential with respect to the second input connected with the first input of said second multiplier stage (64);
   a divider stage (67) having its dividend input connected to the output of said first summing stage (66);
   a third multiplier stage (70) having its output connected to the divisor input of said divider stage (67);
   a gear ratio transducer (41) for producing an electrical signal representative of the gear ratio in use in said transmission (8) having its output connected to a first input of said third multiplier stage (70);
   a device (45) for producing an electrical signal representative of vehicle mass having its output connected to the second input of said third multiplier stage (70);
   a first absolute value forming stage (68) having its input connected to the output of said divider stage (67);
   a second summing stage (69) having a first non-inverting input connected to the output of said first absolute-value stage (68) and having also an inverting second input;
   a second absolute value forming stage (71) having its output connected to said inverting second input of said second summing stage (69) and having is input connected to the output of said means for supplying a voltage representative of the first derivative of the vehicle acceleration, the output of said second summing stage (69) being connectable to said higher-value selecting means (15).

11. An apparatus as defined in claim 4 in which said measuring means includes a circuit for generating an electrical voltage representative of the second time derivative of the vehicle velocity.

12. An apparatus as defined in claim 11 in which said circuit for generating a voltage representative of the second time derivative of vehicle velocity includes velocity transducer (35) for producing an electrical signal representative of vehicle velocity ($v_F$), a first differentiating stage (36) having its input connected to the output of said velocity transducer (35) and a second differentiating stage (37) having its input connected to the output of said fourth differentiating stage (36).

13. An apparatus as defined in claim 11 in which said measuring means includes means for supplying, to said higher-value selecting means (15), a voltage representative of the difference between a first absolute value, which is that of the quotient obtained by dividing the product of the first time derivative of the motor torque ($M_{\dot m}$) by the product of the gear ratio in use and the vehicle mass ($rm_F$), and a second absolute value, which is that is said voltage representative of the second time derivative of the vehicle veolcity.

14. An apparatus as defined in claim 13 in which said circuit for providing a voltage representative of said difference between said absolute values comprises a motor torque transducer (98) producing an electrical signal representative of motor torque, a differentiating stage (53) having its input connected to the output of said motor torque transducer (98), a divider stage (54) having its dividend input connected to the output of said differentiating stage (53), a multiplier stage (57) having its input connected to the divisor input of said divider stage (54), a gear ratio transducer (41) for producing electrical signals representative of the gear ratio in use and of said vehicle transmission having its output connected with a first input of said multiplier stage (57), a device (45) for producing an electrical signal representative of vehicle mass having its output connected with a second input of said multiplier stage (57), a first absolute value forming stage (55) for producing a signal representative of the absolute value of its input signal having its input connected to the output of said divider stage (54), a summing stage (56) having a non-inverting input connected to the output of said first absolute value stage (55) and having also an inverting input, a second absolute value forming stage (59) having its output connected to said inverting input of said summing stage (56) and having its input connected to, the output of said means for supplying a voltage representative of the second time derivative of the vehicle velocity the output of said summing stage (56) being connectable to said hinger-value selecting means (15).

15. An apparatus as defined in claim 11 in which said measuring means includes means for supplying, to said higher-value selecting means (15), a voltage representative of the difference between a first absolute value, which is that of the quotient obtained by dividing the sum of the first time derivative of the throttle position angle times the rate of change of motor torque with respect to throttle position angle plus the first time derivative of motor speed times the rate of change of motor torque with respect to motor speed by the product of gear ratio in use and the vehicle mass, and a second absolute value, which is that of said voltage representative of the second derivative of vehicle velocity.

16. An apparatus as defined in claim 15 in which said circuit for providing a voltage representative of said difference of said absolute values comprises:
- a throttle position angle transducer (60) for producing an electrical signal representative of the angular position (α) of the motor throttle;
- a first differentiating stage (61) having its input connected to the output of said throttle position angle transducer (60);
- a second differentiating stage (63) having its input connected to said motor speed transducer (19);
- a first multiplier stage (62) having a first input connected to the output of said first differentiating stage (61);
- a first summing stage (66) having a first non-inverting input connected to the output of said first multiplier stage (62);
- a second multiplier stage (64) having a second input connected to the output of said second differentiating stage (63) and its output connected to a second non-inverting input of said first summing stage (66).
- a translator stage (65) having one input connected to the output of said throttle position angle transducer (66) and another input connected to said motor speed transducer (19), having a first output that is differential with respect to the first input connected with the second output of said first multiplier stage (62) and a second output that is differential with respect to the second input connected with the first input of said second multiplier stage (64);
- a divider stage (67) having its dividend input connected to the output of said first summing stage (66);
- a third multiplier stage (70) having its output connected to the divisor input of said divider stage (67);
- a gear ratio transducer (41) for producing an electrical signal representative of the gear ratio in use in said transmission (8) having its output connected to a first input of said third multiplier stage (70);
- a device (45) for producing an electrical signal representative of vehicle mass having its output connected to the second input of said third multiplier stage (70);
- a first absolute value forming stage (68) having its input connected to the output of said divider stage (67);
- a second summing stage (69) having a first non-inverting input connected to the output of said first absolute-value stage (68) and having also an inverting second input;
- a second absolute value forming stage (71) having its output connected to said inverting second input of said second summing stage (69) and having its input connected to the output of said means for supplying a voltage representative of the product of the transmission gear ratio and the second time derivative input speed of the transmission, the output of said second summing stage (69) being connectable to said higher-value selecting means (15).

17. An apparatus as defined in claim 4 in which said measuring means includes a circuit for generating a voltage representative of the product of the transmission gear ratio (r) and the second time derivative ($n_a$) of the transmission input speed.

18. An apparatus as defined in claim 17 in which said circuit for generating a voltage representative of the product of transmission gear ratio and the second time derivative of transmission input speed comprises a first differentiating stage (38) having its input connected to the output of said transmission input speed transducer (20), a second differentiating stage (39) having its input connected to the output of said first differentiating stage (38), a multiplying stage (40) having a first input connected to the output of said second differentiating stage (39) and having also a second input, a gear ratio transducer (41) for providing electrical signals representative of the gear ratio in use in the vehicle transmission and having its output connected to said second input of said multiplier stage (40), the output of said multiplier stage (40) being the source of said voltage representative of the second derivative of the vehicle velocity.

19. An apparatus as defined in claim 17 in which said measuring means includes means for supplying, to said higher-value selecting means (15), a voltage representative of the difference between a first absolute value, which is that of the quotient obtained by dividing the product of the first time derivative of the motor torque ($M_m$) by the product of the gear ratio in use and the vehicle mass ($rm_F$), and a second absolute value, which is that of said voltage representative of the product of the transmission gear ratio and the second time derivative of the transmission input speed.

20. An apparatus as defined in claim 19 in which said circuit for providing a voltage representative of said difference between said absolute values comprises a motor torque transducer (98) producing an electrical signal representative of motor torque, a differentiating stage (53) having its input connected to the output of said motor torque transducer (98), a divider stage (54) having its dividend input connected to the output of said differentiating stage (53), a multiplier stage (57) having its input connected to the divisor input of said divider stage (54), a gear ratio transducer (41) for producing electrical signals representative of the gear ratio in use and of said vehicle transmission having its output connected with a first input of said multiplier stage (57), a device (45) for producing an electrical signal representative of vehicle mass having its output connected with a second input of said multiplier stage (57), a first absolute value forming stage (55) for producing a signal representative of the absolute value of its input signal having its input connected to the output of said divider stage (54), a summing stage (56) having a non-inverting input connected to the output of said first absolute value stage (55) and having also an inverting input, a second absolute value forming stage (59) having its output connected to said inverting input of said summing stage (56) and having its input connected to the output of said means for supplying a voltage representative of the product of the transmission gear ratio and the second time derivative of transmission input speed, the output of said summing stage (56) being connectable to said higher-value selecting means (15).

21. An apparatus as defined in claim 17 in which said measuring means includes means for supplying, to said higher-value selective means (15), a voltage representative of the difference between a first absolute value, which is that of the quotient obtained by dividing the sum of the first time derivative of the throttle position angle times the rate of change of motor torque with respect to throttle position angle plus the first time derivative of motor speed times the rate of change of motor torque with respect to motor speed by the product of gear ratio in use and the vehicle mass, and a second absolute value, which is that of said voltage representative of the product of the transmission gear ratio and the second time derivative of the transmission input speed.

22. An apparatus as defined in claim 21 in which said circuit for providing a voltage representative of said difference of said absolute values comprises:
- a throttle position angle transducer (60) for producing an electrical signal representative of the angular position (α) of the motor throttle;
- a first differentiating stage (61) having its input connected to the output of said throttle position angle transducer (60);
- a second differentiating stage (63) having its input connected to said motor speed transducer (19);
- a first multiplier stage (62) having a first input connected to the output of said first differentiating stage (61);
- a first summing stage (66) having a first non-inverting input connected to the output of said first multiplier stage (62);
- a second multiplier stage (64) having a second input connected to the output of said second differentiating stage (63) and its output connected to a second non-inverting input of said first summing stage (66);
- a translator stage (65) having one input connected to the output of said throttle position angle transducer (66) and another input connected to said motor speed transducer (19), having a first output that is differential with respect to the first input connected with the second output of said first multiplier stage (62) and a second output that is differential with respect to the second input connected with the first input of said second multiplier stage (64);
- a divider stage (67) having its dividend input connected to the output of said first summing stage (66);
- a third multiplier stage (70) having its output connected to the divisor input of said divider stage (67);
- a gear ratio transducer (41) for producing an electrical signal representative of the gear ratio in use in said transmission (8) having its output connected to a first input of said third multiplier stage (70);
- a device (45) for producing an electrical signal representative of vehicle mass having its output connected to the second input of said third multiplier stage (70);
- a first absolute value forming stage (68) having its input connected to the output of said divider stage (67);
- a second summing stage (69) having a first non-inverting input connected to the output of said first absolute stage (68) and having also an inverting second input;
- a second absolute value forming stage (71) having its output connected to said inverting second input of said second summing stage (69) and having its input connected to the output of said means for supplying a voltage representative of the product of the transmission gear ratio and the second time derivative of the transmission input speed, the output of said second summing stage (69) being connectable to said higher-value selecting means (15).

23. An apparatus as defined in claim 4 in which said measuring means includes a circuit for generating an electrical signal representative of the quotient obtained by dividing the value of the first time derivative ($M_k$) of the coupling torque by the product of the gear ratio (r) in use in the transmission and of the vehicle mass ($v_F$).

24. An apparatus as defined in claim 23 in which said circuit for generating a voltage representative of said quotient includes a coupling torque transducer (42) providing an electrical signal representative of the torque transmitted through said clutch, a differentiating stage (43) having its input connected to the output of said coupling torque transducer (42), a dividing stage (44) having its dividend input connected to the output of said differentiating stage (43), a multiplier stage (46) having its output connected to the divisor input of said dividing stage (44), a gear ratio transducer (41) for providing an electrical signal representative of the gear ratio in use in the transmission having its output connected to one input of said multiplier stage (46),
- a vehicle mass signal transducer provided for supplying the second input of said multiplier stage (46) an electrical signal representative of the vehicle mass, the output of said first divider stage (44) being the source of said quotient-representative signal.

25. An apparatus as defined in claim 23 in which said measuring means includes means for supplying, to said higher-value selecting means (15), a voltage representative of the difference between a first absolute value, which is that of the quotient obtained by dividing the product of the first time derivative of the motor torque ($M_m$) by the product of the gear ratio in use and the vehicle mass ($rm_F$), and a second absolute value, which is that of said voltage representative of the quotient of coupling torque divided by the product of gear ratio and vehicle mass.

26. An apparatus as defined in claim 25 in which said circuit for providing a voltage representative of said difference between said absolute values comprises a motor torque transducer (98) producing an electrical signal representative of motor torque, a differentiating stage (53) having its input connected to the output of said motor torque transducer (98), a divider stage (54) having its dividend input connected to the output of said differentiating stage (53), a multiplier stage (57) having its input connected to the divisor input of said divider stage (54), a gear ratio transducer (41) for producing electrical signals representative of the gear ratio in use and of said vehicle transmission having its output connected with a first input of said multiplier stage (57), a device (45) for producing an electrical signal representative of vehicle mass having its output connected with a second input of said multiplier stage (57), a first absolute value forming stage (55) for producing a signal representative of the absolute value of its input signal having its input connected to the output of said divider stage (54), a summing stage (56) having a non-inverting input connected to the output of said first absolute value stage (55) and having also an inverting input, a second absolute value forming stage (59) having its output connected to said inverting input of said summing stage (56) and having its input connected to, the output of said means for supplying a voltage representative of the coupling torque divided by the product of gear ratio and vehicle mass the output of said summing stage (56) being connectable to said higher-value selecting means.

27. An apparatus as defined in claim 23 in which said measuring means includes means for supplying, to said higher-value selecting means (15), a voltage representative of the difference between a first absolute value, which is that of the quotient obtained by dividing the sum of the first time derivative of the throttle position angle times the rate of change of motor torque with respect to throttle position angle plus the first time derivative of motor speed times the rate of change of motor torque with respect to motor speed by the product of gear ratio in use and the vehicle mass, and a second absolute value, which is that of said voltage representative of the quotient of coupling torque divided by the product of gear ratio and vehicle mass.

28. An apparatus as defined in claim 27 in which said circuit for providing a voltage representative of said difference of said absolute values comprises:

a throttle position angle transducer (60) for producing an electrical signal representative of the angular position (α) of the motor throttle;

a first differentiating stage (61) having its input connected to the output of said throttle position angle transducer (60);

a second differentiating stage (63) having its input connected to said motor speed transducer (19);

a first multiplier stage (62) having a first input connected to the output of said first differentiating stage (61);

a first summing stage (66) having a first non-inverting input connected to the output of said first multiplier stage (62);

a second multiplier stage (64) having a second input connected to the output of said second differentiating stage (63) and its output connected to a second non-inverting input of said first summing stage (66);

a translator stage (65) having one input connected to the output of said throttle position angle transducer (66) and another input connected to said motor speed transducer (19), having a first output that is differential with respect to the first input connected with the second output of said first multiplier stage (62) and a second output that is differential with respect to the second input connected with the first input of said second multiplier stage (64);

a divider stage (67) having its dividend input connected to the output of said first summing stage (66);

a third multiplier stage (70) having its output connected to the divisor input of said divider stage (67);

a gear ratio transducer (41) for producing an electrical signal representative of the gear ratio in use in said transmission (8) having its output connected to a first input of said third multiplier stage (70);

a device (45) for producing an electrical signal representative of vehicle mass having its output connected to the second input of said third multiplier stage (70);

a first absolute value forming stage (68) having its input connected to the output of said divider stage (67);

a second summing stage (69) having a first non-inverting input connected to the output of said first absolute value stage (68) and having also an inverting second input;

a second absolute value forming stage (71) having its output connected to said inverting second input of said second summing stage (69) and having its input connected to the output of said means for supplying a voltage representative of the quotient of coupling torque divided by the product of gear ratio and vehicle mass, the output of said second summing stage (69) being connectable to said higher-value selecting means (15).

29. An apparatus as defined in claim 4 which said measuring means includes a circuit for generating a voltage representative of the quotient obtained by dividing the product of the moment of inertia (O) of the motor and the second time derivative of the motor speed ($n_m$) by the product of the gear ratio in use (r) and the vehicle mass ($m_F$).

30. An apparatus as defined in claim 29 in which said circuit for generating a signal representative said quotient includes a first differentiating stage (47) having its input connected to the output of said motor speed transducer (19), a second differentiating stage (48) having its input connected to the output of said first differentiating stage (47), a first multiplier stage (49) and a divider stage (51), one input of said multiplier stage (49) being connected to the output of said second differentiating stage (48) and another input of said first multiplier stage (49) being connected to the output of said divider stage (51), a motor moment of inertia transducer (50) for producing an electrical signal representative of motor moment of inertia having its output connected to the divend input of said divider stage (51), a second multiplier stage (52) having its output connected to the divisor input of said divider stage (51), a gear ratio transducer (41) for producing a voltage representative of the gear ratio in use in the transmission having its output connected to a first input of said second multiplier stage (52), and a device (45) for producing electrical signals representative of the vehicle mass having an output connected to a second input of said second multiplier stage (52), the output of said first multiplier stage (49) being the source of said quotient-representative signal.

31. An apparatus as defined in claim 29 in which said measuring means includes means for supplying, to said higher-value selecting means (15), a voltage representative of the difference between a first absolute value, which is that of the quotient obtained by dividing the product of the first time derivative of the motor torque ($\dot{M}_m$) by the product of the gear ratio in use and the vehicle mass ($rm_F$), and a second absolute value, which is representative of the quotient of its product of motor inertia moment and second time derivative of motor speed divided by product of your ratio and vehicle mass.

32. An apparatus as defined in claim 31 in which said circuit for providing a voltage representative of said difference between said absolute values comprises a motor torque transducer (98) producing an electrical signal representative of motor torque, a differentiating stage (53) having its input connected to the output of said motor torque transducer (98), a divider stage (54) having its dividend input connected to the output of said differentiating stage (53), a multiplier stage (57) having its input connected to the divisor input of said divider stage (54), a gear ratio transducer (41) for producing electrical signals representative of the gear ratio in use and of said vehicle transmission having its output connected with a first input of said multiplier stage (57), a device (45) for producing an electrical signal representative of vehicle mass having its output connected with a second input of said multiplier stage (57), a first absolute value forming stage (55) for producing a signal representative of the absolute value of its input signal having its input connected to the output of said divider stage (54), a summing stage (56) having a non-inverting input connected to the output of said first absolute value stage (55) and having also an inverting input, a second absolute value forming stage (59) having its output connected to said inverting input of said summing stage (56) and having its input connected to, said means for supplying the quotient of the product of motor inertia moment and second time derivative of motor speed divided by product of gear ratio and vehicle mass, the output of said first summing stage (56) being connectable to said higher-value selecting means (15).

33. An apparatus as defined in claim 29 in which said measuring means (16) includes means for supplying, to said higher-value selecting means, a voltage representative of the difference between a first absolute value, which is that of the quotient obtained by dividing the sum of the first time derivative of the throttle position angle times the rate of change of motor torque with respect to throttle position angle plus the first time derivative of motor speed times the rate of change of motor torque with respect to motor speed by the product of gear ratio in use and the vehicle mass, and a second absolute value, which is that of said voltage representative of the quotient of the product of motor inertia moment and second time derivative of motor speed divided by the product of gear ratio and vehicle mass.

34. An apparatus as defined in claim 33 in which said circuit for providing a voltage representative of said difference of said absolute values comprises:
  a throttle position angle transducer (60) for producing an electrical signal representative of the angular position (α) of the motor throttle;
  a first differentiating stage (61) having its input connected to the output of said throttle position angle transducer (60);
  a second differentiating stage (63) having its input connected to said motor speed transducer (19);
  a first multiplier stage (62) having a first input connected to the output of said first differentiating stage (61);
  a first summing stage (66) having a first non-inverting input connected to the output of said first multiplier stage (62);
  a second multiplier stage (64) having a second input connected to the output of said second differentiating stage (63) and its output connected to a second non-inverting input of said first summing stage (66);
  a translator stage (65) having one input connected to the output of said throttle position angle transducer (66) and another input connected to said motor speed transducer (19), having a first output that is differential with respect to the first input connected with the second output of said first multiplier stage (62) and a second output that is differential with respect to the second input connected with the first input of said second multiplier stage (64);
  a divider stage (67) having its dividend input connected to the output of said first summing stage (66);
  a third multiplier stage (70) having its output connected to the divisor input of said divider stage (67);
  a gear ratio transducer (41) for producing an electrical signal representative of the gear ratio in use in said transmission (8) having its output connected to a first input of said third multiplier stage (70);
  a device (45) for producing an electrical signal representative of vehicle mass having its output connected to the second input of said third multiplier stage (70);
  a first absolute value forming stage (68) having its input connected to the output of said divider stage (67);
  a second summing stage (69) having a first noninverting input connected to the output of said first absolute-value stage (68) and having also an inverting second input;
  a second absolute value forming stage (71) having its output connected to said inverting second input of said second summing stage (69) and having its input connected to the output of said means for supplying a voltage representative of the quotient of the product of motor inertia moment and second time derivative of motor speed divided by the product of gear ratio and vehicle mass, the output of said second summing stage (69) being connectable to said higher-value selecting means (15).

35. An apparatus as defined in claim 2 in which said calculating means comprises a calculating circuit, having at least a first enabling control input, and also an enabling logic circuit (21) having its output (32) connected to said first enabling control input of said calculating circuit and having at least two inputs, and in which there are also provided a motor speed transducer (19) for producing a signal representative of motor speed and a transmission input speed transducer (20) for producing an electrical signal representative of transmission input speed, the respective outputs of said transducers being connected to respective inputs of said enabling logic circuit, said calculating means being so constituted so as to be enabled to produce a control signal at the output of said calculating means if the difference between the respective first derivatives of motor and transmission input speeds is greater than zero and the motor speed lower than the transmission input spped and likewise if the difference between the respective first time derivatives of motor and transmission input speeds is smaller than zero and the transmission input speed is lower than the motor speed.

36. An apparatus as defined in claim 35 in which said enabling logic circuit (21) includes an equivalence stage for producing an output signal when signals of the same find are provided at its inputs, said equivalence stage output signal being the output signal of said enabling logic circuit, and also includes first and second comparators (22,28), first and second differentiating circuits (24,25), and also substracting means (26, 27), the outputs of said first and second comparators being supplied to the respective inputs of said equivalence stage (23), the inputs of said first comparator (22) being connected to the respective inputs of said first and second differentiating circuits (24, 25) and also constituting the inputs of said enabling logic circuit (21), the inputs of said second comparator (28) being connected respectively to reference potential and to the output of said substracting means (26,27), said first and second differentiating circuits (24,25) having their respective outputs connected to the inputs of said substracting means for causing said subtracting means to produce an output representative of the difference between the outputs of said differentiating circuits, which substracting means output is equal to said reference potential when the outputs of said differentiating circuits (24,25) are equal.

37. An apparatus as defined in claim 36 in which said equivalence stage (23) comprises a NOR gate (29), an AND gate (30) and an OR gate (31), said NOR gate having two inputs respectively connected to two inputs of said AND gate and also constituting the inputs of said equivalence stage, and the respective outputs of said NOR gate (29) and said AND gate (30) being connected respectively with the inputs of said OR gate (31), the output of said OR gate constituting the output of said equivalence stage.

38. An apparatus as defined in claim 35 in which said calculating circuit includes means for supplying, to said higher-value selecting means (15), a voltage representative of the product obtained by multiplying of the absolute value of the difference between the first time derivative of motor speed and the first time derivative of transmission input speed by the quotient obtained by dividing the square root of the transmission stiffness times the moment of inertia of the motor by the transmission gear ratio in use times the vehicle mass.

39. An apparatus as defined in claim 38 in which said means in said calculating circuit for supplying a voltage representative of the product of said absolute value and quotient comprises:
  a first differentiating stage (74) having its input connected to said motor speed transducer (19);
  a second differentiating stage (76) having its input connected to said transmission input speed transducer (20);
  a summing stage (78) having a first input connected to the output of said first differentiating stage and a second input connected to the output of said second differentiating stage;
  an absolute value forming stage (75) having its input connected to the output of said fourth summing stage (78);
  a first multiplier stage (79) having a first input connected to the output of said fifth absolute value forming stage (75);
  a dividing stage (82) having its output connected to the second input of said first multiplier stage (79);
  a first signal producing device (50) for producing an electrical voltage representative of the moment of inertia of the motor;
  a second signal producing device (73) for producing an electrical signal representative of the stiffness of the transmission and its connection to the vehicle wheels;
  a second multiplier stage (80) having its input connected to said first and second devices;
  a square root extracting stage (81) having its input connected to the output of said second multiplier stage (80) and its output connected to the dividend input of said dividing stage (82);
  a third signal producing device (41) for producing an electrical signal representative of the gear ratio in use in said transmission (8);
  a fourth signal producing device (45) for producing an electrical signal representative of the vehicle mass;
  a multiplier stage (83) having its inputs connected to the outputs of said third and fourth devices and having its input connected to the divisor input of said dividing stage (83), the output of said first multiplier stage (79) being connectable to said higher-value selecting means (15).

40. An apparatus as defined in claim 35 in which sai calculating circuit includes means for supplying, to said higher-value selecting stage (15), a voltage representative of the sum of three terms of which the first is the product obtained by by multiplying the absolute value of the difference between the first time derivative of motor speed and the first time derivative of transmission input speed by the quotient obtained by dividing the square root of the transmission stiffness times the moment of inertia of the motor by the product of the transmission gear ratio in use and the vehicle mass, the second term is the product obtained by multiplying the second time derivative of the motor speed by the moment of inertia of the motor and dividing by the product of the gear ratio in use and the mass of the vehicle, and the third term is the product of the second time derivative of the transmission input speed and the gear ratio in use in the transmission.

41. An apparatus as defined in claim 40 which said means in said calculating circuit for supplying a voltage representative of the sum of said three terms comprises:
  a first differentiating stage (74) having its input connected to said motor speed transducer (19);
  a second differentiating stage (76) having its input connected to said transmission input speed transducer (20);
  a first summing stage (78) having a first input connected to the output of said first differentiating stage and a second input connected to the output of said second differentiating stage;
  an absolute value forming stage (75) having its input connected to the output of said summing stage (78);
  a first multiplier stage (79) having a first input connected to the output of said absolute value forming stage (75);
  a first dividing stage (82) having its output connected to the second input of said ninth multiplier stage (79);
  a first signal producing device (50) for producing an electrical voltage representative of the moment of inertia of the motor;
  a second signal producing device (73) for producing an electrical signal representative of the stiffness of the transmission and its connection to the vehicle wheels;
  a second multiplier stage (80) having its input connected to said first and second devices;
  a square root extracting stage (81) having its input connected to the output of said second multiplier stage (80) and its output connected to the dividend input of said dividing stage (82);
  a third signal producing device (41) for producing an electrical signal representative of the gear ratio in use in said transmission (8);
  a fourth signal producing device (45) for producing an electrical signal representative of the vehicle mass;
  a third multiplier stage (83) having its inputs connected to the outputs of said third and fourth devices and having its input connected to the divisor input of said dividing stage (83);
  a third differentiating stage (84) having its input connected to the output of said second differentiating stage (76);
  a fourth multiplier stage (85) having a first input connected to the output of said third differentiating stage (84) and its second input connected to the output of said third device (41);
  a second summing stage (86) having one input connected to the output of said fourth multiplier stage (85);

a fourth differentiating stage (88) having its input connected to the output of said first differentiating stage (74);

a fifth multiplier stage (89) having a first input connected to the output of said fourth differentiating stage (88);

a second dividing stage (87) having its output connected to the second input of said fifth multiplier stage (89) and its dividend input connected to the output of said second device (50) and also having its divisor input connected to the output of said third multiplier stage (83);

a third summing stage (77) having a first input connected to the output of said second summing stage (86), said second summing stage (86) having its second input connected to the output of said third multiplier stage (89) and the second input of said third summing stage (77) being connected with the output of said first multiplier stage (79), the output of said third summing stage (77) being connectable to said higher-value selecting means (15).

42. An apparatus as defined in claim 35 in which said calculating circuit includes means for supplying, to said higher-value selecting means (15), a voltage representative of the product of a first term and a second term, the first term being the absolute value of the difference between the first time derivative of the motor speed and the quotient obtained by dividing the motor torque by the product of the vehicle mass and the square of the gear ratio in use in the transmission, said second term being the quotient obtained by dividing the square root of the product of the moment of inertia of the motor and the stiffness of the transmission and its connection to the vehicle wheels by the product of the vehicle mass and the gear ratio in use in the transmission.

43. An apparatus as defined in claim 42 in which said means in said calculating circuit for providing said voltage representative of the product of two terms comprises:

a differentiating stage (90) having its input connected to said motor speed transducer (19);

a summing stage (92) having a first input connected to the output of said differentiating stage (90);

a first dividing stage (94) having its output connected to the second input of said summing stage (92);

a throttle position transducer (60) for producing a voltage representative of the position of the throttle of the motor;

a characteristic curve storage and translation device (93) having inputs connected respectively to said motor speed transducer (19) and of said throttle position transducer (60) having its output connected to the dividend input of said first dividing stage (94);

a first signal producing device (41) for producing voltage representative of the gear ratio in use in said transmission (8);

a first multiplier stage (95) having both of its inputs connected to the output of said first signal producing device (41);

a second multiplier stage (96) having a first input connected to the output of said first multiplier stage (95) and having its output connected to the divisor input of said first dividing stage (94);

a third multiplier stage (97) having a first input connected to the output of said first signal producing device (41);

a second signal producing device (45) for producing an electrical voltage representative of the vehicle mass, having its output connected with a second input of each of said second and third multiplier stages;

a second dividing stage (101) having its divisor input connected to the output of said third multiplier stage (97);

a third signal producing device (50) for producing an electrical signal representative of the moment of inertia of the motor;

a fourth signal producing device (73) for producing an electrical signal representative of the stiffness of the transmission (8) and its connection to the vehicle wheels;

a fourth multiplier stage (99) having its two inputs respectively connected to the outputs of said third and fourth signal producing devices (50, 73);

a square root extracting circuit (100) having its input connected to the output of said fourth multiplier stage (99) having its output connected to the dividend input of said second dividing stage (101);

a fifth multiplier stage (102) having a first input connected to the output of said second dividing stage (101);

an absolute value forming stage (91) having its input connected to the output of said summing stage (92) and its output connected to the second input of said fifth multiplier stage (102), the output of said fifth multiplier stage (102) being connectable to said higher-value selecting means (15).

* * * * *